United States Patent
Harada

(10) Patent No.: US 11,632,481 B2
(45) Date of Patent: *Apr. 18, 2023

(54) MEDIUM DISCHARGING APPARATUS INCLUDING A DISCHARGE TRAY CONTAINING MULTIPLE TRAYS ARRANGED IN MULTIPLE POSTURES FORMING DIFFERENT ANGLES AND IMAGE READING APPARATUS

(71) Applicant: SEIKO EPSON CORPORATION, Tokyo (JP)

(72) Inventor: Hidenori Harada, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

This patent is subject to a terminal disclaimer.

(21) Appl. No.: 16/777,377

(22) Filed: Jan. 30, 2020

(65) Prior Publication Data

US 2020/0252512 A1    Aug. 6, 2020

(30) Foreign Application Priority Data

Jan. 31, 2019  (JP) .............................. JP2019-015328

(51) Int. Cl.
*H04N 1/00* (2006.01)
*B65H 29/12* (2006.01)
*B65H 31/20* (2006.01)

(52) U.S. Cl.
CPC ......... *H04N 1/00604* (2013.01); *B65H 29/12* (2013.01); *B65H 31/20* (2013.01); *H04N 1/00591* (2013.01); *H04N 1/00615* (2013.01)

(58) Field of Classification Search
CPC .......... B65H 2402/343; B65H 2402/46; B65H 2405/1111; B65H 2405/11164; B65H 2405/1124; B65H 2405/324; B65H 2801/12; B65H 2801/39; B65H 29/12; B65H 31/02; B65H 31/20; H04N 1/00604;

(Continued)

(56) References Cited

U.S. PATENT DOCUMENTS

| 5,903,364 | A  | 5/1999  | Shih-Min       |
| 8,330,998 | B2 | 12/2012 | Yoshida et al. |
| 10,764,462| B2 | 9/2020  | Miyauchi       |

(Continued)

FOREIGN PATENT DOCUMENTS

| CN | 108290697 | 7/2018 |
| JP | H10-006617 | 1/1998 |

(Continued)

*Primary Examiner* — Chad Dickerson
(74) *Attorney, Agent, or Firm* — Workman Nydegger

(57) ABSTRACT

A scanner including a medium discharging apparatus includes a discharge tray including a first tray configured to receive a front end of a medium discharged by a discharge roller pair and allow placement of the medium therein, and a second tray that is located downstream of the first tray in a medium discharge direction and configured to allow placement of the medium therein, the discharge tray being configured to switch between a first posture in which the first tray and the second tray form a first angle $\alpha 1$, and a second posture in which the first tray and the second tray form a second angle $\alpha 2$ smaller than the first angle $\alpha 1$, without changing the posture of the first tray with respect to the discharge roller pair.

12 Claims, 17 Drawing Sheets

(58) Field of Classification Search
CPC ........... H04N 1/00615; H04N 1/00591; H04N 1/00519; H04N 1/05; H04N 1/00522
USPC .............. 358/498, 500–505, 474, 1.11–1.18; 347/102; 271/213
See application file for complete search history.

(56) References Cited

U.S. PATENT DOCUMENTS

| | | | | |
|---|---|---|---|---|
| 11,019,231 | B2* | 5/2021 | Koyanagi | ........... H04N 1/00604 |
| 2003/0206762 | A1* | 11/2003 | Hwang | .................... B41J 29/02 400/693 |
| 2005/0052518 | A1* | 3/2005 | Kagami | ................. B41J 13/106 271/278 |
| 2007/0077110 | A1* | 4/2007 | Bartman | ................ B65H 31/00 400/693 |
| 2007/0154248 | A1 | 7/2007 | Chen | |
| 2007/0188818 | A1 | 8/2007 | Westcott | |
| 2009/0103251 | A1 | 4/2009 | Suzuki et al. | |
| 2010/0053701 | A1 | 3/2010 | Yoshida et al. | |
| 2011/0075226 | A1 | 3/2011 | Fujiwara | |
| 2011/0228350 | A1 | 9/2011 | Wakaura | |
| 2012/0307324 | A1 | 12/2012 | Tu | |
| 2013/0163056 | A1 | 6/2013 | Yukiyoshi | |
| 2013/0329262 | A1 | 12/2013 | Yamane | |
| 2014/0002869 | A1 | 1/2014 | Takemoto et al. | |
| 2014/0167349 | A1* | 6/2014 | Niimura | ................. B65H 31/02 271/213 |
| 2015/0042035 | A1* | 2/2015 | Washino | .................. B65H 1/04 271/145 |
| 2017/0111535 | A1 | 4/2017 | Morimoto et al. | |
| 2017/0174464 | A1* | 6/2017 | Tanaka | ............... G03G 15/6552 |
| 2018/0022564 | A1* | 1/2018 | Obara | .................... B65H 31/22 271/223 |
| 2018/0093511 | A1 | 4/2018 | Taketsugu et al. | |
| 2018/0257895 | A1* | 9/2018 | Kaneko | .................. B65H 31/22 |
| 2019/0132455 | A1 | 5/2019 | Mlyauchi et al. | |
| 2019/0132464 | A1 | 5/2019 | Mlyauchi et al. | |
| 2019/0135000 | A1 | 5/2019 | Harris et al. | |
| 2019/0233241 | A1 | 8/2019 | Kaneko et al. | |
| 2019/0297215 | A1 | 9/2019 | Miyauchi | |
| 2021/0250457 | A1* | 8/2021 | Koyanagi | .......... H04N 1/00604 |

FOREIGN PATENT DOCUMENTS

| | | |
|---|---|---|
| JP | 2008-168580 | 7/2008 |
| JP | 2008-197191 | 8/2008 |
| JP | 2009-527143 | 7/2009 |
| JP | 2009-190346 | 8/2009 |
| JP | 2010-062839 | 3/2010 |
| JP | 2014-086819 | 5/2014 |
| JP | 2016-179907 | 10/2016 |
| JP | 2018-104154 | 7/2018 |
| JP | 2018-104155 | 7/2018 |
| JP | 2018-184285 | 11/2018 |
| JP | 2019-083428 | 5/2019 |
| JP | 2019-083429 | 5/2019 |
| JP | 2019-165362 | 9/2019 |

* cited by examiner

MEDIUM DISCHARGING APPARATUS INCLUDING A DISCHARGE TRAY CONTAINING MULTIPLE TRAYS ARRANGED IN MULTIPLE POSTURES FORMING DIFFERENT ANGLES AND IMAGE READING APPARATUS

The present application is based on, and claims priority from JP Application Serial Number 2019-015328, filed Jan. 31, 2019, the disclosure of which is hereby incorporated by reference herein in its entirety.

BACKGROUND

1. Technical Field

The present disclosure relates to a medium discharging apparatus that discharges a medium, and an image reading apparatus including the medium discharging apparatus.

2. Related Art

Some scanners as an example of an image reading apparatus include a medium discharging apparatus that automatically feeds a plurality of media toward a reading unit and discharges the media after being read by the reading unit. The medium discharging apparatus includes a discharge tray for stacking the media read by the reading unit.

For example, JP-A-2010-62839 and JP-A-2018-104154 disclose a scanner including a discharge tray on which read media ejected from the scanner body are stacked.

In the scanner described in JP-A-2010-62839, a document discharge table as a discharge tray includes a front surface cover disposed upstream in a medium discharge direction, and an upper surface cover disposed downstream in the medium discharge direction.

In the scanner described in JP-A-2018-104154, the discharge tray includes a first discharge tray disposed upstream in the medium discharge direction, and a first extension tray, a second extension tray, and a third extension tray that are sequentially disposed downstream in the medium discharge direction.

The scanner discharge tray (document discharge table) disclosed in JP-A-2010-62839, because the tray angle when receiving media is fixed, may cause a stack failure depending on the type of media and the state of the media such as creased or curled. In addition, when the tray angle is fixed, the apparatus size in the medium discharge direction is also fixed.

The scanner discharge tray disclosed in JP-A-2018-104154 can change the angle of the discharge tray when receiving media; however, since the angle of the entire discharge tray is changed, the angle of the first discharge tray on which the front end of the media discharged from the scanner body lands changes. As the inclination of the first discharge tray rising in the medium discharge direction becomes steeper, the medium entry angle with respect to the tray surface increases, and the possibility of media buckling increases.

SUMMARY

According to an aspect of the present disclosure, a medium discharging apparatus includes a discharger that discharges a medium from a casing, and a discharge tray including a first tray configured to receive a front end of the medium discharged by the discharger and allow placement of the medium therein, and a second tray that is located downstream of the first tray in a medium discharge direction and configured to allow placement of the medium therein, the discharge tray being configured to switch between a first posture in which the first tray and the second tray form a first angle in a side view in the medium discharge direction, and a second posture in which the first tray and the second tray form a second angle smaller than the first angle without changing the posture of the first tray with respect to the discharger.

DESCRIPTION OF EXEMPLARY EMBODIMENTS

Figure 1:
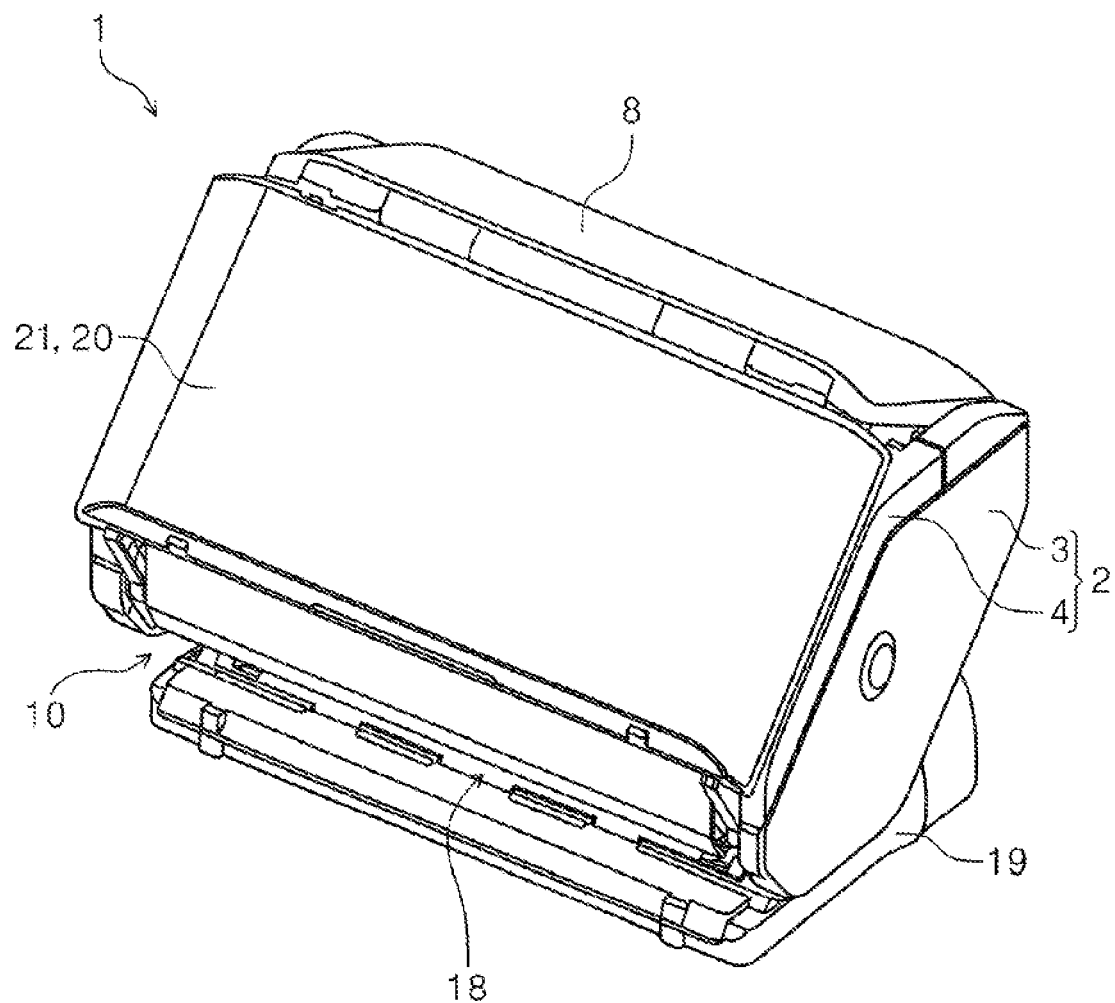
FIG. 1 is an external perspective view of a scanner in which a discharge tray and a feed tray are in a stored state.

Hereinafter, the present disclosure will be schematically described.

A medium discharging apparatus according to a first aspect includes a discharger that discharges a medium from a casing, a discharge tray including a first tray configured to receive a front end of the medium discharged by the discharger and allow placement of the medium therein, and a second tray that is located downstream of the first tray in a medium discharge direction and that is configured to allow placement of the medium therein, the discharge tray being configured to switch between a first posture in which the first tray and the second tray form a first angle in a side view in the medium discharge direction, and a second posture in which the first tray and the second tray form a second angle smaller than the first angle without changing the posture of the first tray with respect to the discharger.

According to this aspect, because the discharge tray is configured to switch between the first posture in which the first tray and the second tray form a first angle in a side view in the medium discharge direction, and the second posture in which the first tray and the second tray form a second angle smaller than the first angle without changing the posture of the first tray with respect to the discharger, it is possible to switch between the first posture and the second posture in accordance with the type and state of the medium or the space where the apparatus is installed.

In this case, because the posture of the first tray with respect to the discharger does not change even if the first posture and the second posture are switched, the entry angle of the front end of the medium discharged by the discharger to a placement surface of the first tray does not change. Therefore, the possibility of buckling of the medium that occurs when the angle of the entire discharge tray is changed can be reduced.

In a second aspect according to the first aspect, the discharge tray is configured to switch between a deployed state that allows placement of the medium can be placed therein and a stored state in which a portion of the casing is covered by the first tray or both the first tray and the second tray.

According to this aspect because the discharge tray is configured to switch between the deployed state in which a medium can be placed therein and the stored state in which a portion of the casing is covered by the first tray or both the first tray and the second tray, for example, when storing the apparatus, the apparatus can be made compact while using the discharge tray in the stored state as a cover for the casing. In addition, the same effect as the first aspect is acquired in the discharge tray in the deployed state.

In a third aspect according to the first aspect or the second aspect, the second tray is configured to be stored in the first tray.

According to this aspect, because the second tray is configured to be stored in the first tray, for example, when the apparatus is not being used or the size of the medium discharged to the discharge tray is small, the second tray can be stored in the first tray, and the apparatus can be arranged in a space-saving manner.

In a fourth aspect according to the third aspect, the second tray includes a sliding shaft that is configured to slide with respect to the first tray in the medium discharge direction and an opposite direction, the first tray includes a guide rail that guides the sliding shaft, and the guide rail has, for positioning the sliding shaft, a first position where the angle of the second tray with respect to the first tray becomes a first angle and a second position where the angle becomes a second angle.

According to this aspect, it is possible to switch between the first posture and second posture of the discharge tray by sliding the sliding shaft of the second tray along the guide rail.

In a fifth aspect according to the fourth aspect, the guide rail includes a holding portion that holds the sliding shaft in one or both of the first position and the second position.

According to this aspect, because the guide rail includes the holding portion that holds the sliding shaft in one or both of the first position and the second position, the posture of the discharge tray can be held.

In a sixth aspect according to any one of the first aspect to the third aspect, the discharge tray is configured to switch between the first posture and the second posture by pivoting of the second tray with respect to the first tray, and the discharge tray includes a locking portion that locks the discharge tray in one or both of the first posture and the second posture.

According to this aspect, it is possible to switch between the first posture and the second posture of the discharge tray and maintain the posture.

In a seventh aspect according to any one of the first to sixth aspects, the second tray is provided with a third tray that can be deployed and stored with respect to the second tray.

According to this aspect, because the second tray is provided with the third tray that can be extended and stored with respect to the second tray, the length of the discharge tray in the medium discharge direction can be further extended.

An image reading apparatus according to an eighth aspect includes a reading unit that reads an image of a medium; and the medium discharging apparatus according to any one of the first to seventh aspects that discharges the medium read by the reading unit.

According to this aspect, in the image reading apparatus including the reading unit that reads the image of the medium and the medium discharging apparatus that discharges the medium read by the reading unit, effects similar to any one of the first to seventh aspects can be obtained.

First Embodiment

First, an outline of an image reading apparatus according to an embodiment of the present disclosure will be described with reference to the drawings. In the present embodiment, as an example of the image reading apparatus, a scanner 1 capable of reading at least one of the front surface and rear surface of a medium will be exemplified. The scanner 1 is a so-called document scanner that reads an original such as a document.

In the XYZ coordinate system illustrated in each drawing, the X direction is the apparatus width direction, and the Y direction is the apparatus depth direction. The Z direction indicates the height direction. In addition, the +Y direction corresponds to the front of the apparatus, and the −Y direction corresponds to the rear of the apparatus. In addition, when viewed from the front of the apparatus, the left side is the +X direction, and the right side is the −X direction. In addition, the +Z direction corresponds to the upper side of the apparatus, and the −Z direction side corresponds to the lower side of the apparatus. In addition, the direction in which a medium P is fed is referred to as "downstream", and the opposite direction is referred to as "upstream".

Scanner Outline

Hereinafter, the scanner 1 according to the present disclosure will be described with reference mainly to FIGS. 1 to 6.

Figure 6:
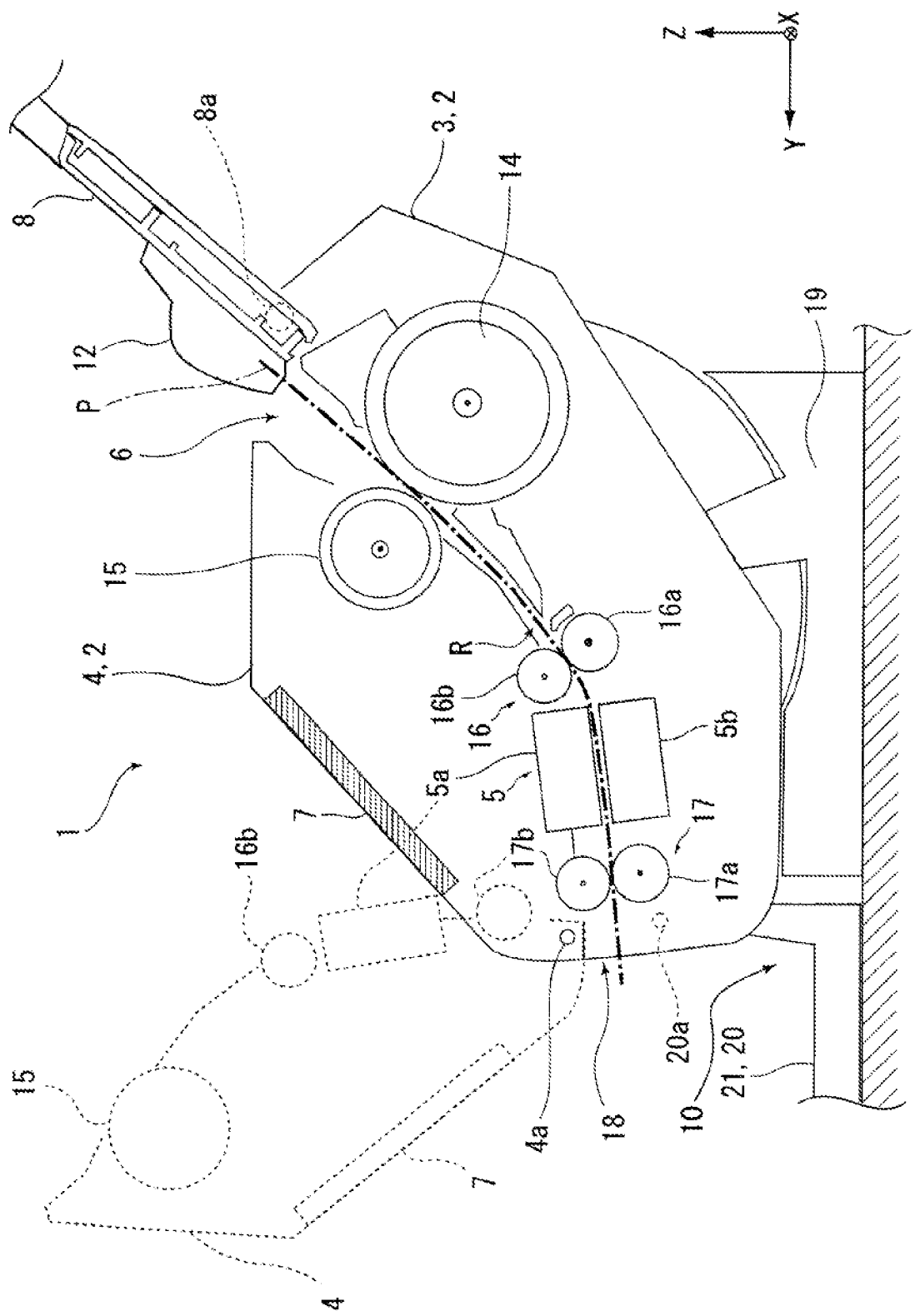
FIG. 6 is a side sectional view illustrating a medium transport path in the scanner.

The scanner 1 illustrated in FIG. 1 includes a reading unit 5 (FIG. 6) to be described later, and includes a medium discharging apparatus 10 that discharges the medium P read by the reading unit 5 to a discharge tray 20. The medium discharging apparatus 10 includes a casing 2 having a medium transport path R illustrated in FIG. 6. As illustrated in FIG. 6, the reading unit 5 is provided inside the casing 2 and is disposed so as to read the medium P transported on the medium transport path R.

In the present embodiment, an apparatus in which the reading function of the reading unit 5 is omitted from the scanner 1 can also be regarded as the medium discharging apparatus 10.

In the upper rear portion of the casing 2, a supply portion 6 that is a supply port through which the medium P is supplied to the medium transport path R and a feed tray 8 on which the medium P to be supplied from the supply portion 6 can be placed are provided. In addition, a discharging portion 18 that is a discharge port through which the medium P is discharged after being read by the reading unit 5 and the discharge tray 20 that receives the medium P discharged from the discharging portion 18 are provided at a lower front portion of the casing 2. The medium P after being read by the reading unit 5 is discharged from the discharging portion 18 to the discharge tray 20 by a discharge roller pair 17 (FIG. 6) to be described later.

As illustrated in FIG. 6, the feed tray 8 is provided so as to be pivotable with respect to a pivot shaft 8a provided in the casing 2. Similarly, as illustrated in FIG. 6, the discharge tray 20 is provided so as to be pivotable with respect to a pivot shaft 20a provided in the casing 2.

Figure 2:
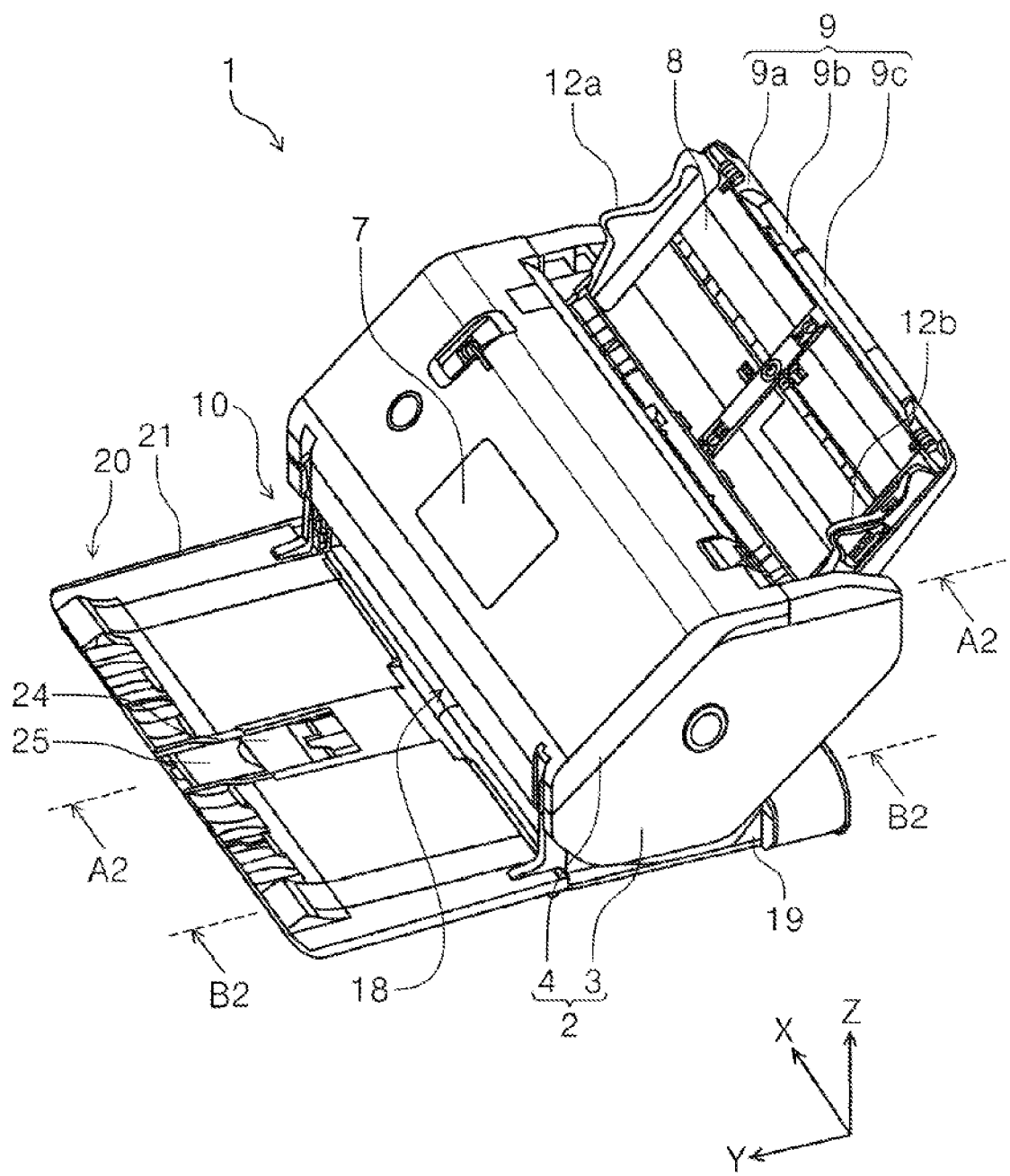
FIG. 2 is an external perspective view of a scanner in which a discharge tray and a feed tray are in a deployed state.

The scanner 1 is configured to switch between a stored state in which both the feed tray 8 and the discharge tray 20 cover a portion of the casing 2 as illustrated in FIG. 1, and, a deployed state in which the medium P can be placed on both the feed tray 8 and the discharge tray 20 as illustrated in FIG. 2.

Because the feed tray 8 and the discharge tray 20 can be folded and stored, for example, when the scanner 1 is not being used, the apparatus can be made compact while using the feed tray 8 and the discharge tray 20 as a cover for the casing 2.

As illustrated in FIG. 1, the casing 2 is formed of a lower unit 3 forming a lower portion of the casing 2 and an upper unit 4 forming an upper portion of the casing 2.

The upper unit 4 is, by pivoting with respect to a pivot shaft 4a illustrated in FIG. 6, configured to be switchable between a closed state in which the lower unit 3 is covered as illustrated by the solid line in FIG. 6, and an open state in which the lower unit 3 is exposed as illustrated by a dotted line in FIG. 6. By opening the upper unit 4, the medium transport path R can be exposed and maintenance can be performed inside the casing 2. The medium transport path R will be described after the outline of the scanner 1 is described.

Figure 5:
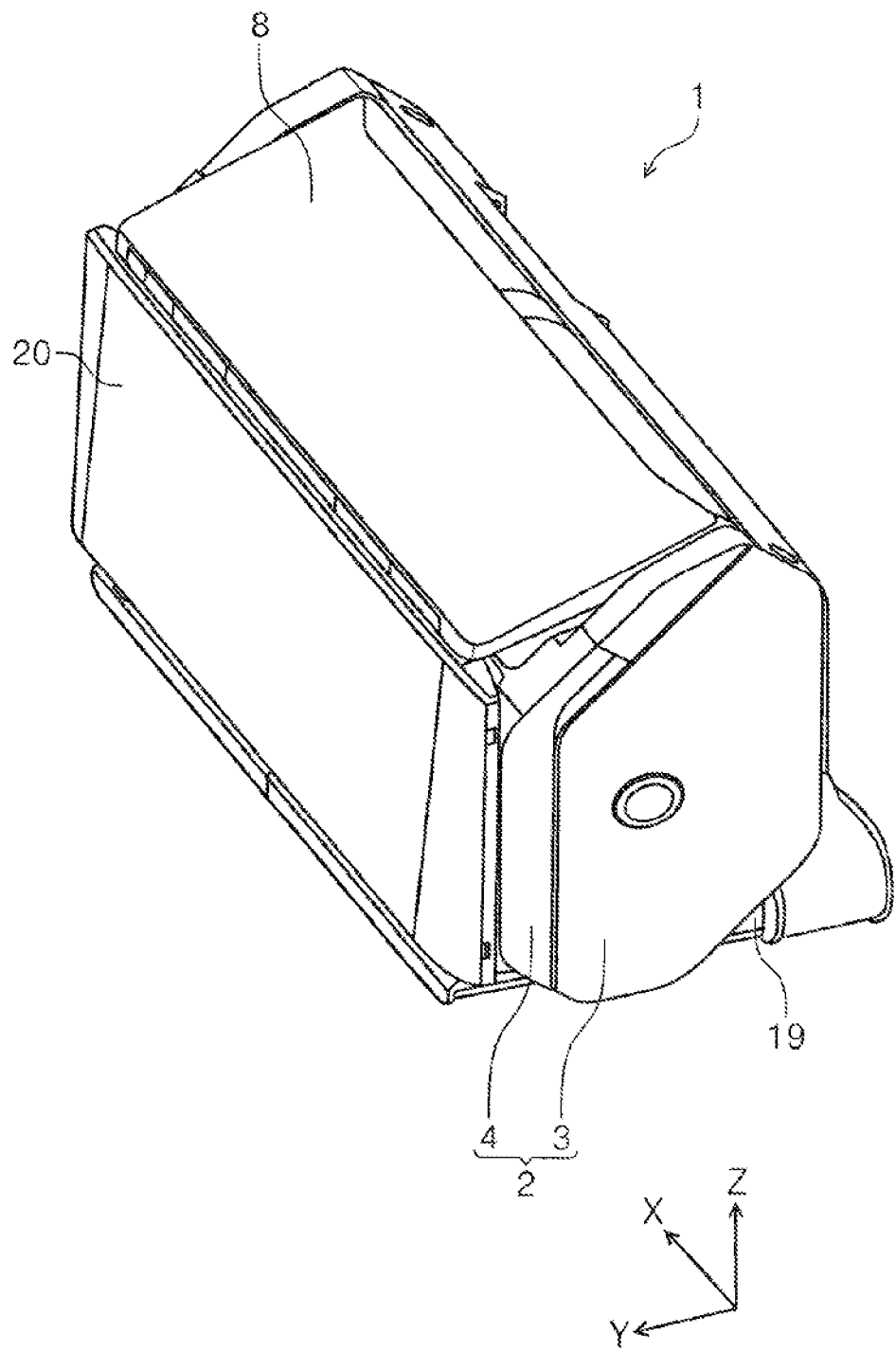
FIG. 5 is an external perspective view of a scanner in which an angle of a casing supported by a support member is different from that in FIG. 1.

The casing 2 is supported by a support member 19 as illustrated in FIGS. 1 to 6. The casing 2 is configured such that the support posture with the support member 19 can be changed from the posture illustrated in FIG. 1 to the posture illustrated in FIG. 5. The casing 2 in FIG. 1, as illustrated in FIGS. 2 to 4 and FIG. 6, is supported by the support member 19 in the same posture as when the medium P is transported and image reading by the reading unit 5 is performed. On the other hand, the casing 2 in FIG. 5 is supported by the support member 19 in a posture in which the discharging portion 18, which is located at a lower front portion in FIG. 1, faces downward. By arranging the casing 2 in the posture illustrated in FIG. 5, the depth of the scanner 1 can be made compact. In addition, it is possible to reduce the likelihood of dust and the like entering the casing 2 from the discharging portion 18.

As illustrated in FIG. 2, the feed tray 8 is provided with edge guides 12a and 12b that guide side edges of the medium P in the width direction (X-axis direction) intersecting a medium transport direction.

The edge guides 12a and 12b are provided so as to be slidable in the X-axis direction in accordance with the size of the medium P. In the present embodiment, the edge guides 12a and 12b are configured such that following the X movement of the edge guide 12a on the +X side by a known rack and pinion mechanism, the edge guide 12b on the −X side moves in the opposite direction.

The feed tray 8 is configured such that the medium P is aligned at the center thereof in the width direction and is fed by a so-called center sheet feeding method by a feeding roller 14 (described later) provided in a center region in the width direction.

Figure 3:
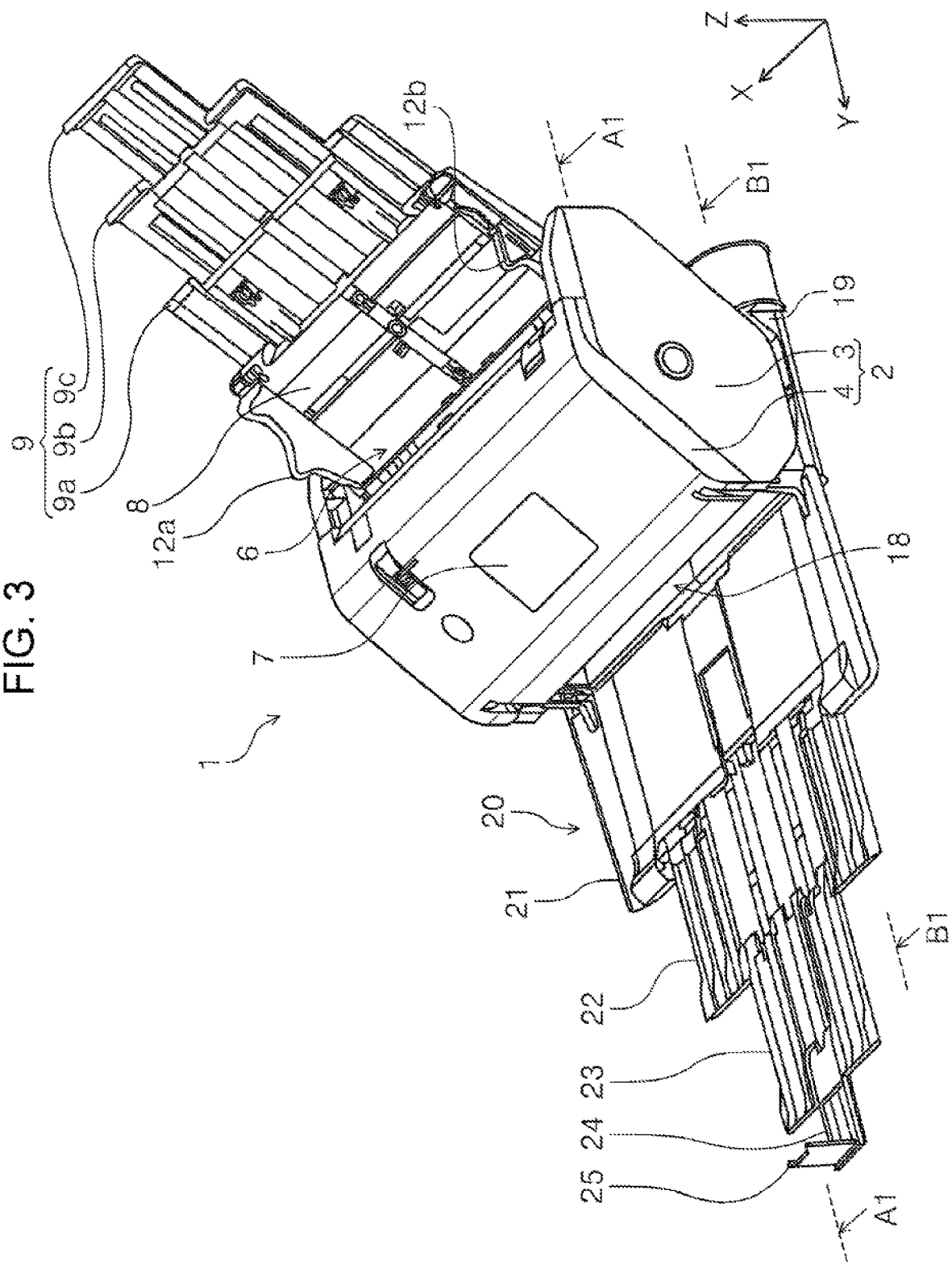
FIG. 3 is an external perspective view of a printer in which an auxiliary discharge tray and an auxiliary feed tray are pulled out and the discharge tray is in a first posture.
Figure 4:
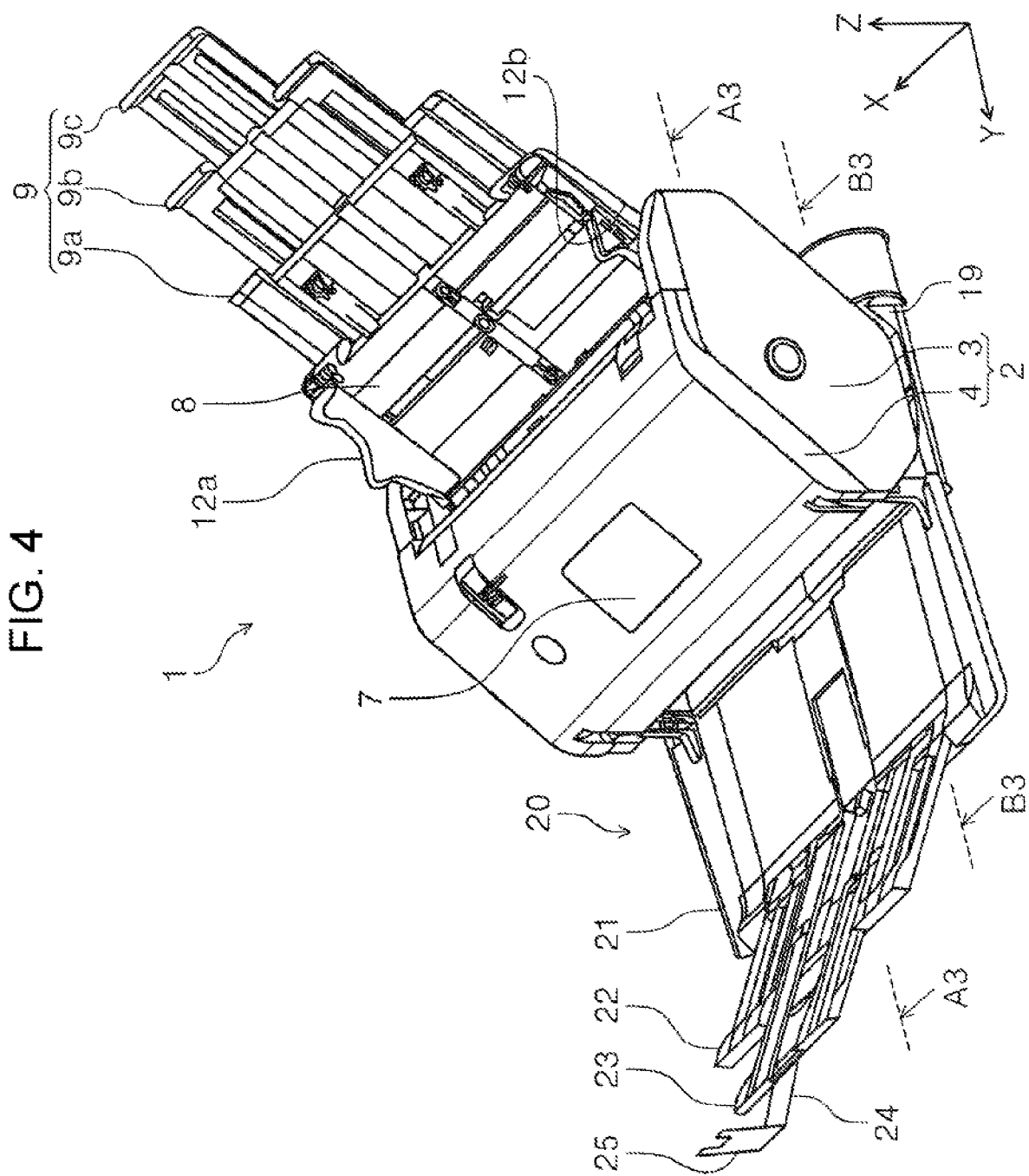
FIG. 4 is an external perspective view of a printer in which an auxiliary discharge tray and an auxiliary feed tray are pulled out and the discharge tray is in a second posture.

In addition, the feed tray 8 includes an auxiliary feed tray 9 that is capable of switching between a pulled-out state in which the auxiliary feed tray 9 is pulled out from the feed tray 8 as illustrated in FIG. 3, and a stored state in which the auxiliary feed tray 9 is stored in the feed tray 8 as illustrated in FIG. 2. The auxiliary feed tray 9 is formed of three trays including a first auxiliary feed tray 9a, a second auxiliary feed tray 9b, and a third auxiliary feed tray 9c. By setting the auxiliary feed tray 9 in the pulled-out state as illustrated in FIG. 3, the length of the feed tray 8 can be extended. Therefore, the medium P can be supported more reliably in the feed tray 8. When the scanner 1 is placed in the stored state illustrated in FIG. 1, the auxiliary feed tray 9 is stored in the feed tray 8.

As illustrated in FIG. 3, the discharge tray 20 includes a first tray 21 that receives the front end of the medium P that is discharged by the discharge roller pair 17 (FIG. 6) and on which the medium P can be placed, and a second tray 22 that is located downstream of the first tray 21 in the medium discharge direction and on which the medium P can be placed. In addition, the second tray 22 includes a third tray 23 that can be deployed and stored with respect to the second tray 22. Furthermore, the third tray 23 includes a fourth tray 24 that can be deployed and stored with respect to the third tray 23. The third tray 23 and the fourth tray 24 can further extend the length of the discharge tray 20 in the medium discharge direction.

The second tray 22 is configured to be slidable with respect to the first tray 21. The third tray 23 is configured to be slidable with respect to the second tray 22. The fourth tray 24 is configured to be slidable with respect to the third tray 23.

Figure 7:
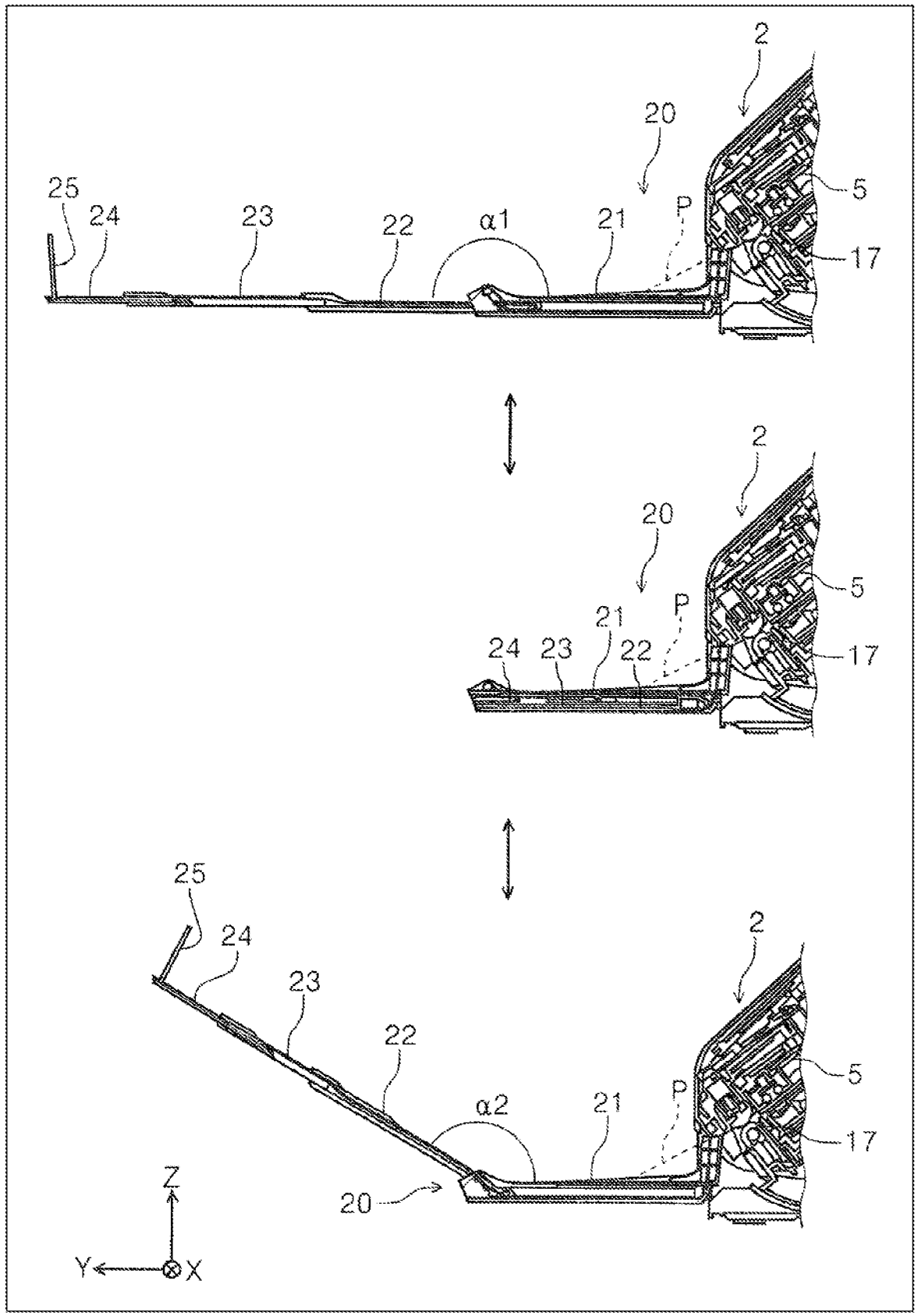
FIG. 7 is a view for explaining the first posture and second posture of the discharge tray.

As illustrated in the middle diagram of FIG. 7, the third tray 23 is stored in the second tray 22 with the fourth tray 24 stored therein, and the second tray 22 in which the third tray 23 and the fourth tray 24 are stored is stored in the first tray 21. As a result, all of the second tray 22, the third tray 23, and the fourth tray 24 are stored in the first tray 21.

At the front end of the fourth tray 24, a restricting portion 25 is provided that is foldable with respect to the fourth tray 24 and restricts the movement of the medium P placed on the discharge tray 20 in the +Y direction. Further, the second tray 22, the third tray 23, and the fourth tray 24 may be configured to be folded and stored instead of being stored in the upstream tray.

Because the second tray 22, the third tray 23, and the fourth tray 24 can be stored in the first tray 21, when the apparatus is not being used or when the size of the medium P discharged to the discharge tray 20 is small, the second tray to the fourth tray can be stored in the first tray 21, and the apparatus can be arranged in a space-saving manner.

The configuration of the discharge tray 20 that is a characteristic portion of the scanner 1 or the medium discharging apparatus 10 of the present embodiment will be described in more detail after the medium transport path R has been described.

In addition, as illustrated in FIG. 2, the upper unit 4 is provided with an operation panel 7 for displaying content related to apparatus operation such as reading setting content. The operation panel 7 can be configured, for example, as a touch panel and can perform various settings, reading execution, and the like in addition to display of content related to apparatus operation.

Medium Transport Path

The medium transport path R in the medium discharging apparatus 10 will be described below mainly with reference to FIG. 6. In the medium transport path R to which the medium P is supplied from the feed tray 8, the feeding roller 14, a separation roller 15, a transport roller pair 16, the reading unit 5, and the discharge roller pair 17 are arranged in order from the upstream side in the medium transport direction.

The transport roller pair 16 includes a transport driving roller 16a and a transport driven roller 16b. The discharge roller pair 17 is a discharger that discharges the medium P from the casing 2, and includes a discharge driving roller 17a and a discharge driven roller 17b.

The feeding roller 14, the transport driving roller 16a, and the discharge driving roller 17a are provided to be pivotable with respect to the lower unit 3. In addition, the separation roller 15, the transport driven roller 16b, and the discharge driven roller 17b provided at a position facing the feeding roller 14 are provided to be pivotable with respect to the upper unit 4.

The medium P placed on the feed tray 8 is picked up by the feeding roller 14 and sent toward the transport roller pair 16. Specifically, the medium P is fed downstream by the feeding roller 14 rotating while being in contact with the surface of the medium P that faces the feed tray 8. Therefore, when a plurality of media P are set on the feed tray 8 of the scanner 1, the media P on the lower side are sequentially fed downstream.

At a position facing the feeding roller 14 in FIG. 6, the separation roller 15, which nips the medium P between the separation roller 15 and the feeding roller 14 to separate the medium P, is provided.

The transport roller pair 16 transports the medium P fed by the feeding roller 14 toward the reading unit 5. Similarly to the feeding roller 14, the transport roller pair 16 is also provided in the center region in the X-axis direction, which is the width direction.

The reading unit 5 includes a first reading unit 5a provided on the upper unit 4 side and a second reading unit 5b provided on the lower unit 3 side. In the present embodiment, the first reading unit 5a and the second reading unit 5b are formed as a contact image sensor module (CISM) as an example.

The first reading unit 5a reads the surface of the medium P facing upward, and the second reading unit 5b reads the opposite surface of the medium P, that is, the surface of the medium P facing downward.

The medium P, after having at least one surface read by the reading unit 5, is nipped by the discharge roller pair 17 located downstream of the reading unit 5 and is discharged from the discharging portion 18.

Further, in the present embodiment, the feeding roller 14, the separation roller 15, the transport driving roller 16a, and the discharge driving roller 17a are driven by a drive source (not illustrated) so as to rotate. In addition to a configuration in which the rollers are all driven by the same drive source, the rollers may be driven by two or more drive sources.

In this embodiment, as an example, the separation roller 15, the transport driving roller 16a, and the discharge driving roller 17a are driven by a common drive source, and the feeding roller 14 is driven by another drive source.

Discharge Tray

Hereinafter, the discharge tray 20 will be described.

As described above, the discharge tray 20 illustrated in FIG. 3 includes the first tray 21 that receives the front end of the medium P that is discharged by the discharge roller pair 17 (FIG. 6) and on which the medium P can be placed, and the second tray 22 that is located downstream of the first tray 21 in the medium discharge direction, that is, in the +Y direction, and on which the medium P can be placed. In addition, the discharge tray 20 includes the third tray 23 positioned downstream of the second tray 22 and the fourth tray 24 positioned further downstream thereof.

In the present embodiment, as illustrated in FIG. 7, in the side view in the medium discharge direction, the discharge tray 20 is configured to switch between a first posture in which the first tray 21 and the second tray 22 form a first angle α1 (upper view in FIG. 7) and a second posture in which the first tray 21 and the second tray 22 form a second angle α2 smaller than the first angle α1 without changing the posture of the first tray 21 with respect to the discharge roller pair 17 (discharging unit).

Further, the upper view of FIG. 7 is an enlarged view of the main portion of the section taken along the line A1-A1 of FIG. 3. The middle view of FIG. 7 is an enlarged view of a main portion of the section taken along the line A2-A2 of FIG. 2. The lower view of FIG. 7 is an enlarged view of the main portion of the section taken along the line A3-A3 of FIG. 4.

In the present embodiment, as an example, the first angle α1 is set to about 180° so that the first tray 21 and the second tray 22 are substantially flush. In addition, the second angle α2 is set to an obtuse angle.

Because the posture of the first tray 21 with respect to the discharge roller pair 17 does not change when the discharge tray 20 is switched between the first posture and the second posture, even if the posture of the discharge tray 20 is switched, the entry angle of the front end of the medium P discharged by the discharge roller pair 17 into the first tray 21 does not change. Therefore, the risk of buckling of the front end of the medium P that occurs when the entirety of the discharge tray 20 is pivoted to change the inclination angle of the discharge tray 20 can be reduced.

The first posture and the second posture of the discharge tray 20 can be switched between the first posture and the second posture in accordance with the type of the medium P, such as the rigidity and thickness of the medium P, the state of the medium being bent or curled, and the space where the scanner 1 is to be installed.

For example, because the second posture of the discharge tray 20 (the lower diagram in FIG. 7) is an inclined posture in which the second tray 22 rises in the medium discharge direction, the entire length of the discharge tray 20 in the Y-axis direction is shorter than the first posture (upper view in FIG. 7). Therefore, by setting the discharge tray 20 of the scanner 1 to the second posture, the installation space for the scanner 1 can be made compact.

On the other hand, when the rigidity of the medium P is high, or when the front end of the medium P is bent downward or curled, the front end of the medium P may abut against the second tray 22, which is inclined, and may buckle.

When discharging such a medium P, buckling of the front end of the medium P can be suppressed by setting the discharge tray 20 to the flat first posture (upper view in FIG. 7).

Configuration for Switching Posture of Discharge Tray

Figure 8:
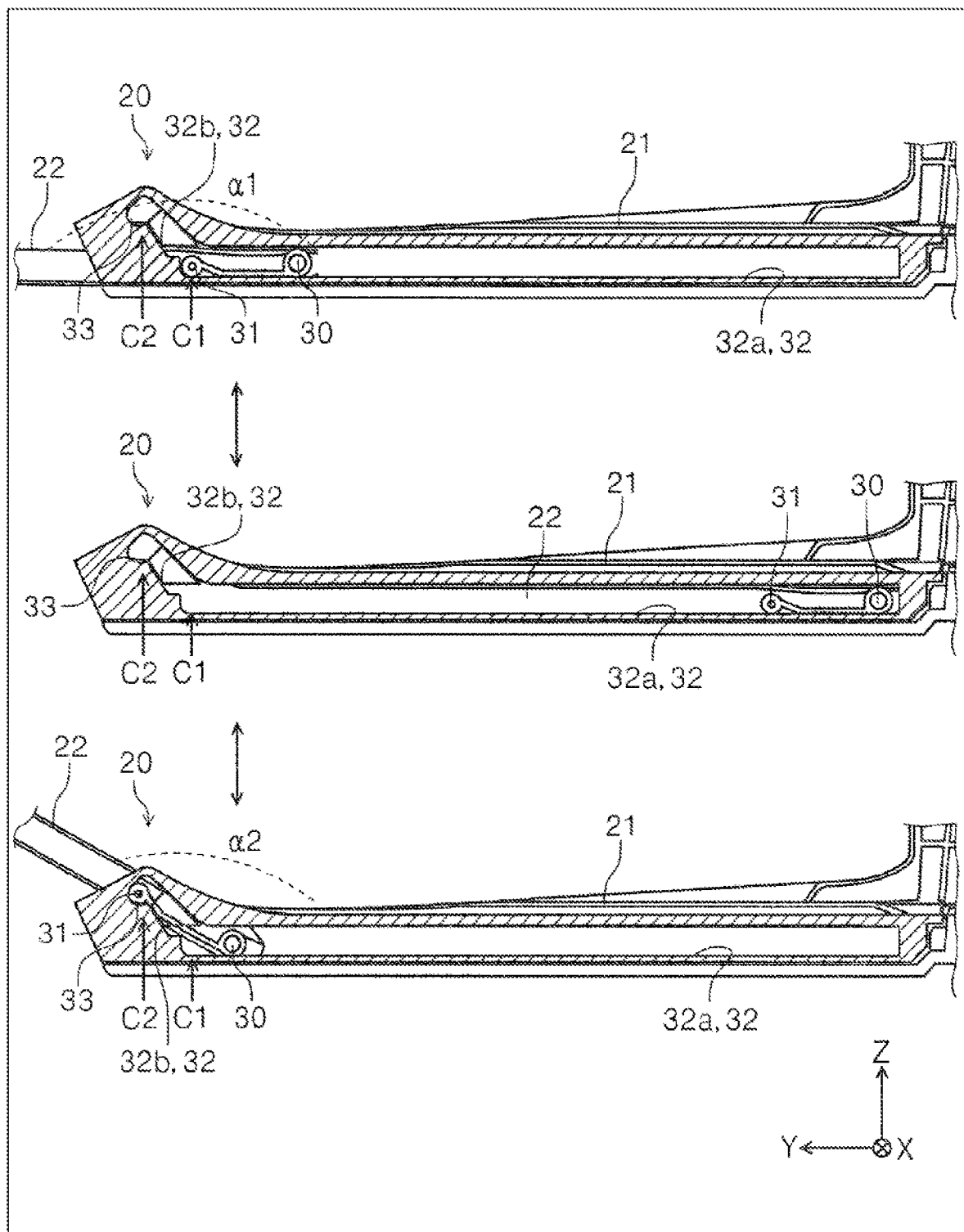
FIG. 8 is a diagram illustrating a configuration for switching between the first posture and second posture of the discharge tray.

Hereinafter, an example of a configuration for switching between the first and second postures of the discharge tray 20 will be described with reference to FIG. 8. Further, the upper diagram of FIG. 8 is an enlarged view of the main portion of the section taken along the line B1-B1 of FIG. 3. The middle diagram of FIG. 8 is an enlarged view of a main portion of the section taken along the line B2-B2 of FIG. 2. The lower diagram of FIG. 8 is an enlarged view of the main part of the section taken along line B3-B3 of FIG. 4.

As illustrated in each drawing of FIG. 8, the second tray 22 is a −Y direction end portion that is upstream in the medium discharge direction, and includes a tray pivot shaft 30 at both ends in the width direction intersecting the medium discharge direction. In addition, the second tray 22 includes a sliding shaft 31 that can slide with respect to the first tray 21 in the medium discharge direction (+Y direction) and in the opposite direction (−Y direction). The sliding shaft 31 is provided in the +Y direction with respect to the tray pivot shaft 30 with a slight gap from the tray pivot shaft 30.

The first tray 21 includes a guide rail 32 that guides the sliding shaft 31. Further, in the present embodiment, the tray pivot shaft 30 is also guided by the guide rail 32.

The guide rail 32 includes, for positioning the sliding shaft 31, a first position C1 (upper diagram in FIG. 8) where the angle of the second tray 22 with respect to the first tray 21 is the first angle α1, and a second position C2 (lower diagram in FIG. 8) where the angle is a second angle α2.

More specifically, the guide rail 32 includes a first rail portion 32a that extends substantially horizontally in the first tray 21, and a second rail portion 32b that is inclined toward the +Z direction from a +Y side end portion of the first rail portion 32a.

In the present embodiment, the first position C1 is a +Y side end portion of the first rail portion 32a, and the second position C2 is disposed on a +Y side end portion of the second rail portion 32b.

In a state where the second tray 22 is stored in the first tray 21, the sliding shaft 31 is in the position illustrated in the middle diagram of FIG. 8. When the second tray 22 is pulled out in the +Y direction, the sliding shaft 31 moves in the +Y direction while being guided by the first rail portion 32a. When the sliding shaft 31 is located at the first position C1, which is the +Y side end portion of the first rail portion 32a, because the movement of the sliding shaft 31 in the +Y direction is restricted, the second tray 22 is not pulled out further in the +Y direction. Accordingly, as illustrated in the upper diagram of FIG. 8, the discharge tray 20 can be in the first posture in which the first tray 21 and the second tray 22 are substantially flush with each other.

In addition, when the discharge tray 20 is in the second posture in which the angle of the second tray 22 with respect to the first tray 21 is the obtuse second angle α2, after the second tray 22 has been pulled out until the sliding shaft 31 has been guided along the first rail portion 32a and positioned at the first position C1, the front end of the second tray 22 is lifted further upward, and the second tray 22 is pulled out in the +Y direction while being pivoted with respect to the tray pivot shaft 30. At this time, the sliding shaft 31 moves along the second rail portion 32b.

A recessed portion 33 is formed in the second position C2 as illustrated in the middle diagram of FIG. 8, and when the sliding shaft 31 is fitted into the recessed portion 33, the angle of the second tray 22 with respect to the first tray 21 is maintained at the second angle α2. In other words, the recessed portion 33 is a holding portion that holds the sliding shaft 31 at the second position C2.

With the configuration as described above, the first posture and the second posture of the discharge tray 20 can be easily switched.

Further, a recessed portion can also be provided through which the sliding shaft 31 can enter the first position C1 of the first rail portion 32a. As a result, a click feeling can be obtained when the second tray 22 is completely pulled out, and the sliding shaft 31 can be configured not to easily move from the first position C1.

Further, the deployed state in which the medium P can be placed in the discharge tray 20 may be a state in which the second tray 22, the third tray 23, and the fourth tray 24 are stored in the first tray 21 as illustrated in FIG. 2, or, as illustrated in FIG. 3, all or some of the second tray 22, the third tray 23, and the fourth tray 24 may be pulled out.

In addition, in the present embodiment, in the stored state of the scanner 1 illustrated in FIG. 1, a portion of the casing 2 is covered with the first tray 21 in a state where the second tray 22, the third tray 23, and the fourth tray 24 are stored; however, the casing 2 may be covered with both the first tray 21 and the second tray 22, or the first tray, the second tray 22, and the third tray 23.

First Modification of Configuration for Changing Posture of Discharge Tray

Figure 9:
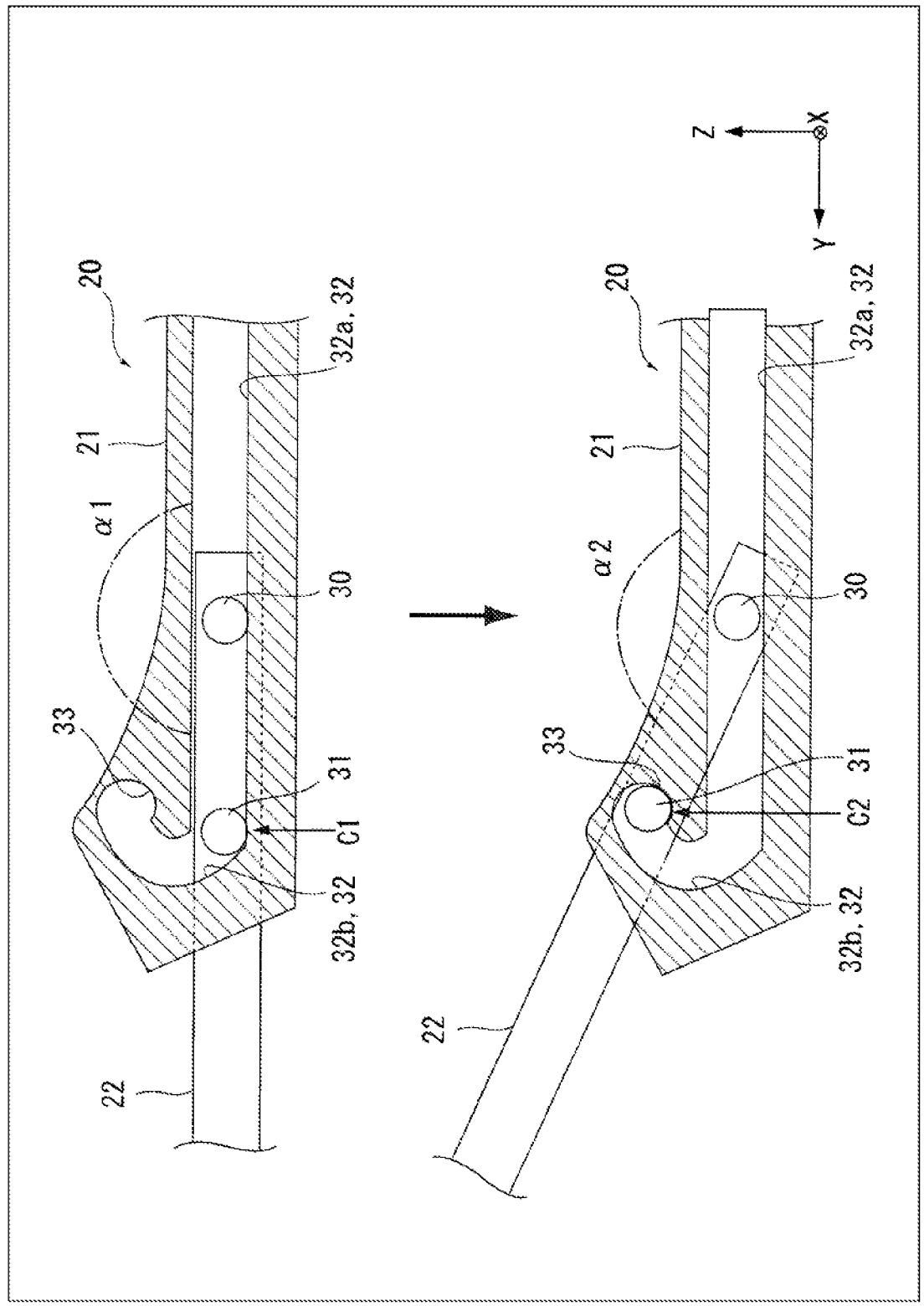
FIG. 9 is a diagram for explaining a first modification of the first embodiment.

The guide rail 32 can also be formed as in a first modification illustrated in FIG. 9. In the guide rail 32 illustrated in FIG. 9, the first rail portion 32a extends substantially horizontally in the first tray 21 as in FIG. 8. A +Y direction end portion of the first rail portion 32a is the first position C1. The second rail portion 32b is formed in an arc shape from the +Y direction end portion of the first rail portion 32a, and the recessed portion 33 is formed at an end portion of the second rail portion 32b. The position of the recessed portion 33 is the second position C2.

In the configuration of FIG. 8, when the discharge tray 20 is in the second posture (the lower diagram in FIG. 8), the front end of the second tray 22 is lifted upward from the state of the first posture (the upper diagram in FIG. 8), and the second tray 22 is pulled out in the +Y direction while being pivoted with respect to the tray pivot shaft 30; however, when the second rail portion 32b is formed in an arc shape as illustrated in FIG. 9, the second tray 22 can be pivoted without almost changing the position of the tray pivot shaft 30.

In addition, also in the first modification, a state in which the angle of the second tray 22 with respect to the first tray 21 is set to the second angle α2 can be maintained by fitting the sliding shaft 31 into the recessed portion 33.

Second Modification of Configuration for Changing Posture of Discharge Tray

Figure 10:
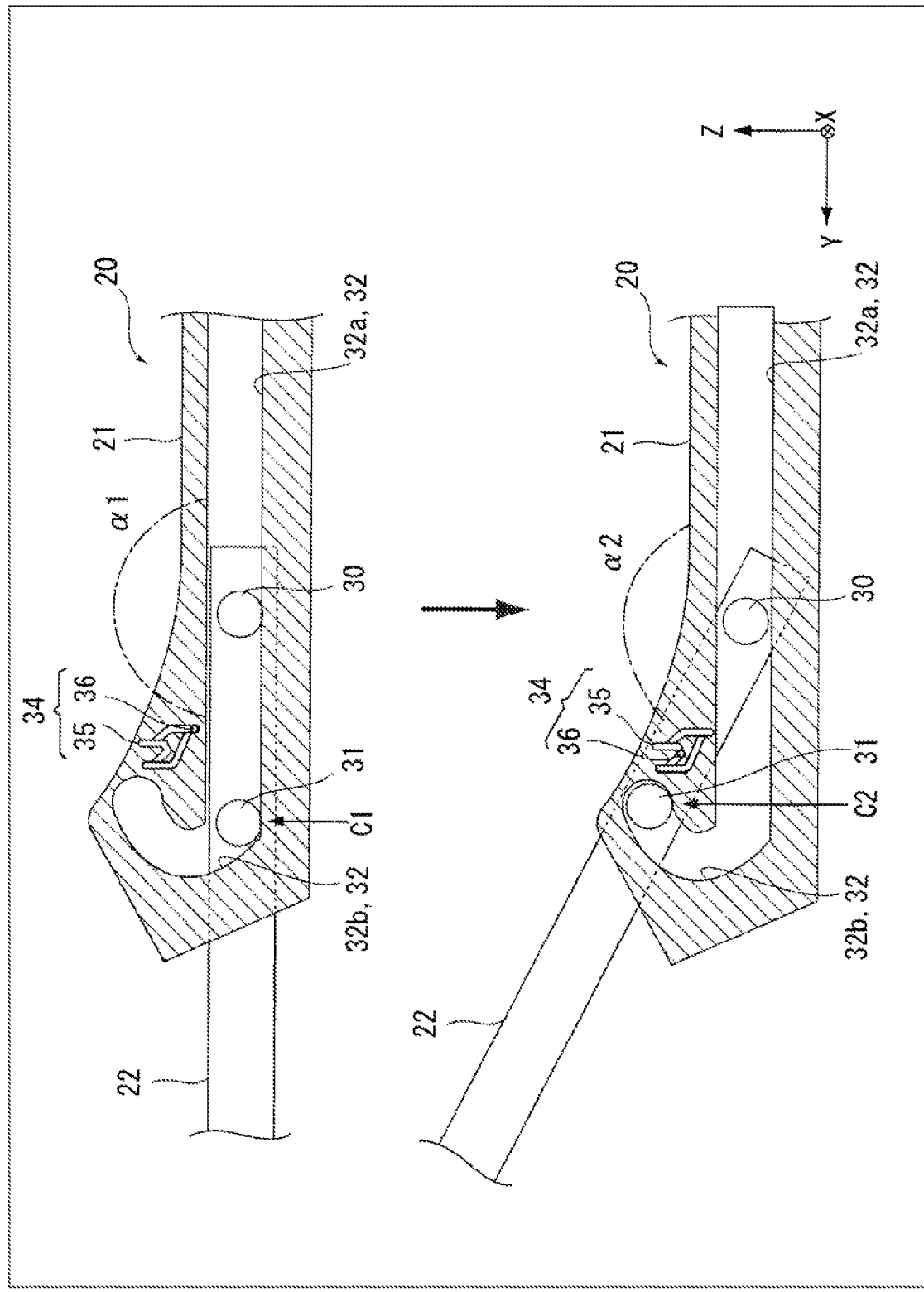
FIG. 10 is a diagram for explaining a second modification of the first embodiment.

The guide rail 32 can also be formed as in a second modification illustrated in FIG. 10. The guide rail 32 is configured in the same manner as the first modification illustrated in FIG. 9 except that the recessed portion 33 is not formed.

In the second modification illustrated in FIG. 10, a heart cam mechanism 34 is provided for positioning the angle of the second tray 22 with respect to the first tray 21 to the first angle α1 and the second angle α2. The heart cam mechanism 34 includes a heart cam groove 35 provided in the first tray 21 and a sliding pin 36 provided in the second tray 22. The sliding pin 36 can slide in the heart cam groove 35 only in the counterclockwise direction along a planar surface in FIG. 10.

When the sliding pin 36 is in the position illustrated in the upper diagram of FIG. 10, the sliding shaft 31 is located at the first position C1 of the first rail portion 32a, and the angle of the second tray 22 with respect to the first tray 21 is positioned at the first angle α1. When the sliding pin 36 is in the position illustrated in the lower diagram of FIG. 10, the sliding shaft 31 is located at the second position C2 of the second rail portion 32b, and the angle of the second tray 22 with respect to the first tray 21 is positioned at the second angle α2.

Third Modification of Configuration for Changing Posture of Discharge Tray

Figure 11:
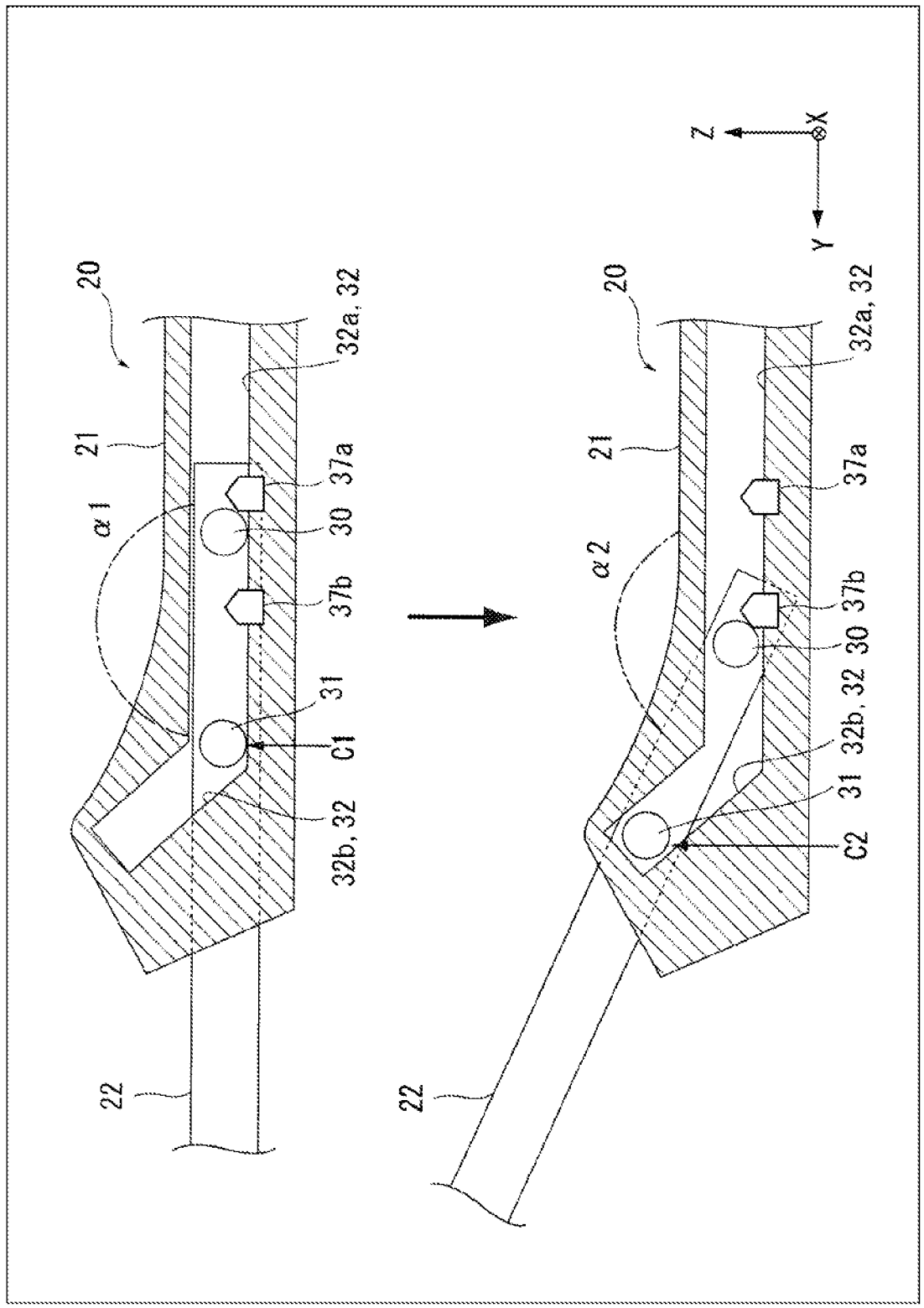
FIG. 11 is a diagram for explaining a third modification of the first embodiment.

The mechanism for positioning the angle of the second tray 22 with respect to the first tray 21 to the first angle α1 and the second angle α2 may be formed as in a third modification illustrated in FIG. 11.

The third modification illustrated in FIG. 11 includes a first stopper 37a and a second stopper 37b as a holding portion for holding the sliding shaft 31 at the first position C1 or the second position C2. The first stopper 37a and the second stopper 37b are provided at positions corresponding to the tray pivot shaft 30 in the X-axis direction, which is the width direction.

The first stopper 37a and the second stopper 37b are pressed upward from below the guide rail 32 by a pressing member such as a spring member (not illustrated) and protrude into the guide rail 32. When the second tray 22 is pulled out in the +Y direction or retracted in the −Y direction, the first stopper 37a and the second stopper 37b are configured so as to be pushed by the tray pivot shaft 30 and to recede below the guide rail 32.

As illustrated in the upper diagram of FIG. 11, the first stopper 37a is disposed in the Y-axis direction immediately upstream (−Y direction) of the tray pivot shaft 30 when the sliding shaft 31 is located at the first position C1, and when the sliding shaft 31 is positioned at the first position C1, the tray pivot shaft 30 is restricted from moving in the −Y direction.

In addition, as illustrated in the lower diagram of FIG. 11, the second stopper 37b is disposed immediately upstream (−Y direction) of the tray pivot shaft 30 when the sliding shaft 31 is located at the second position C2 in the Y axis direction, and the tray pivot shaft 30 is restricted from moving in the −Y direction when the sliding shaft 31 is located at the second position C2.

The angle of the second tray 22 with respect to the first tray 21 can be set to the first angle α1 by the first stopper 37a, and, the angle of the second tray 22 with respect to the first tray 21 can be set to the second angle α2 by the second stopper 37b.

Fourth Modification of Configuration for Changing Posture of Discharge Tray

Figure 12:
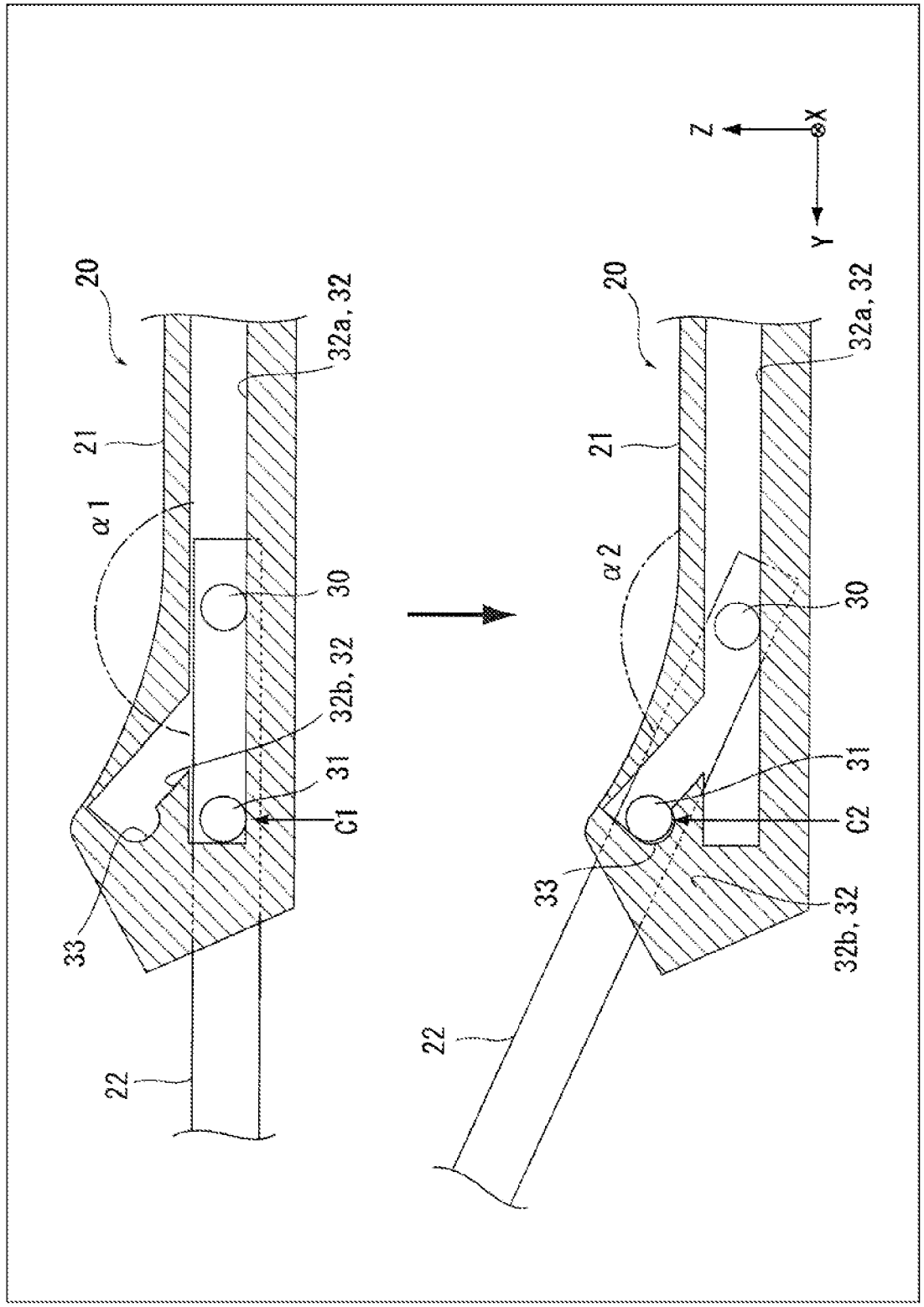
FIG. 12 is a diagram for explaining a fourth modification of the first embodiment.

The guide rail 32 can also be formed as in a fourth modification illustrated in FIG. 12. In the guide rail 32 illustrated in FIG. 12, the first rail portion 32a extends substantially horizontally in the first tray 21. A +Y direction end portion of the first rail portion 32a is the first position C1. The second rail portion 32b branches from upstream (−Y direction) of the +Y direction end portion of the first rail portion 32a, and the recessed portion 33 is formed at the end portion of the second rail portion 32b. The position of the recessed portion 33 is the second position C2. By doing this, the guide rail 32 may be branched into a Y shape.

Further, without forming the recessed portion 33 in the end portion of the second rail portion 32b, it is also possible to provide the heart cam mechanism 34 as in the second modification illustrated in FIG. 10, or to provide the first stopper 37a and the second stopper 37b as in the third modification example illustrated in FIG. 11.

Second Embodiment

Hereinafter, another example of the discharge tray 20 will be described with reference to FIG. 13.

The discharge tray 20 described in the second embodiment is configured to switch between a first posture (upper view in FIG. 13) and a second posture (lower view in FIG. 13) as the second tray 22 pivots with respect to the first tray 21, and includes a support bar 41 as a locking portion that locks the discharge tray 20 in one or both of the first posture and the second posture.

Figure 13:
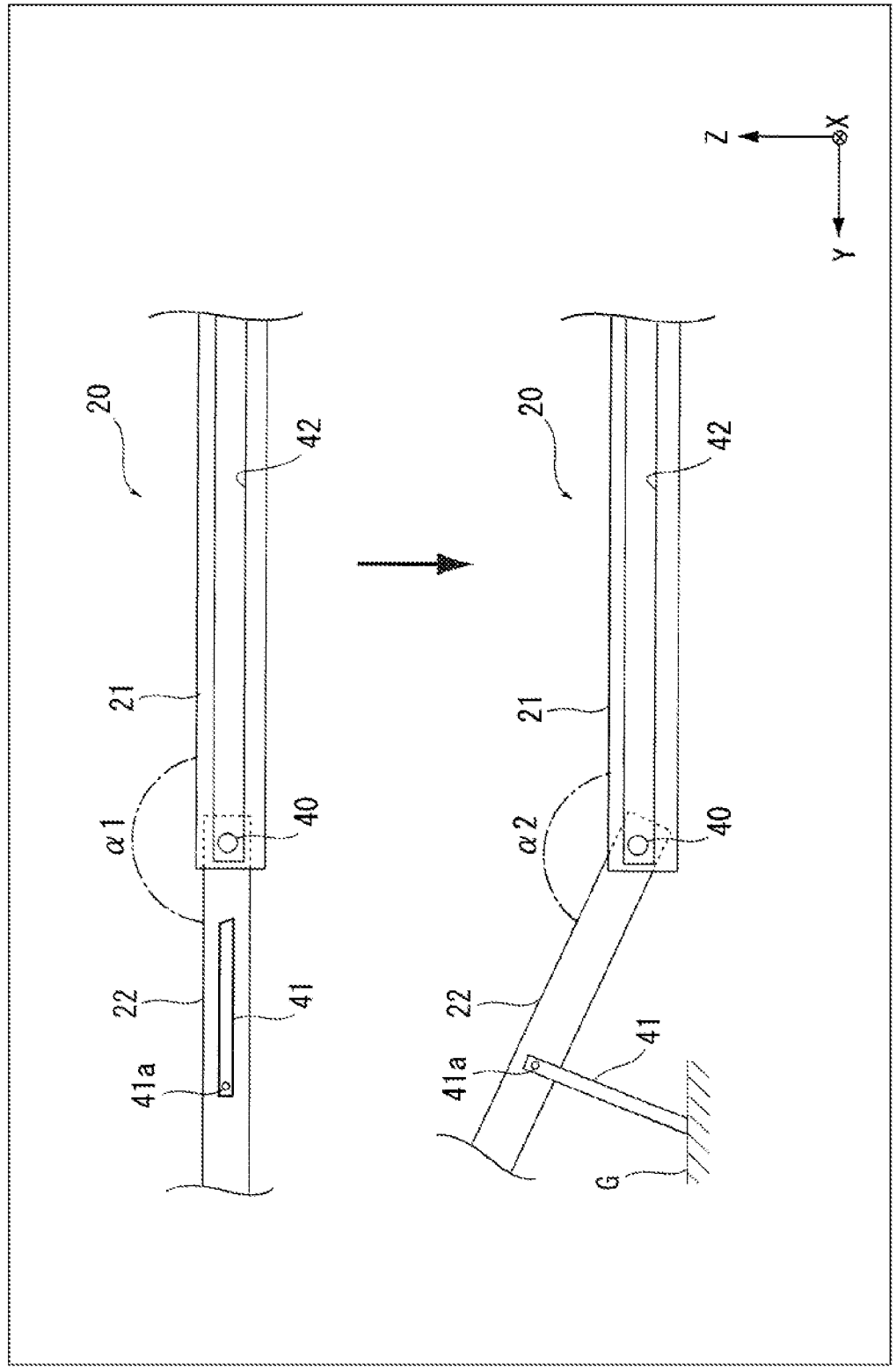
FIG. 13 is a diagram illustrating a second embodiment.

In the discharge tray 20 illustrated in FIG. 13, a tray pivot shaft 40 is provided at a −Y direction end portion of the second tray 22. The first tray 21 is provided with a guide rail 42 along which the tray pivot shaft 40 slides. The guide rail 42 extends substantially horizontally in the first tray 21.

Although not illustrated, in a state where the second tray 22 is stored in the first tray 21, the tray pivot shaft 40 is located at a −Y direction end portion of the guide rail 42. When the second tray 22 is pulled out, the tray pivot shaft 40 slides along the guide rail 42 in the +Y direction, and as illustrated in the upper diagram of FIG. 13, when the tray pivot shaft 40 reaches a +Y direction end portion of the guide rail 42, the second tray 22 is restricted from being pulled out in the +Y direction.

From the state of the discharge tray 20 illustrated in the upper diagram of FIG. 13, that is, from the state in which the angle of the second tray 22 with respect to the first tray 21 is in the first posture where the first angle α1 is set, when the tip of the second tray 22 is lifted upward, the second tray 22 can be pivoted about the tray pivot shaft 40.

The second tray 22 is provided with the support bar 41 as the locking portion described above. When the discharge tray 20 is set to the first posture illustrated in the upper diagram of FIG. 13 or when the second tray 22 is stored in the first tray 21, the support bar 41 is attached along the support surface of the second tray 22. When the discharge tray 20 is set to the second posture illustrated in the lower diagram of FIG. 13, the posture of the second tray 22 can be maintained by pivoting the support bar 41 so as to intersect with the support surface of the second tray 22, and bringing the free end of the support bar 41 into contact with an installation surface G of the scanner 1, or the like.

With the configuration as described above, the discharge tray 20 can be easily switched between the first posture and second posture and the posture can be maintained.

In addition, the discharge tray 20 may be configured to switch between not only the above-described two postures but also a plurality of postures by pivoting of the second tray 22 with respect to the first tray 21. In this configuration, a locking portion that locks the discharge tray 20 may be provided in each of a plurality of postures.

Modification of Locking Portion

Figure 14:
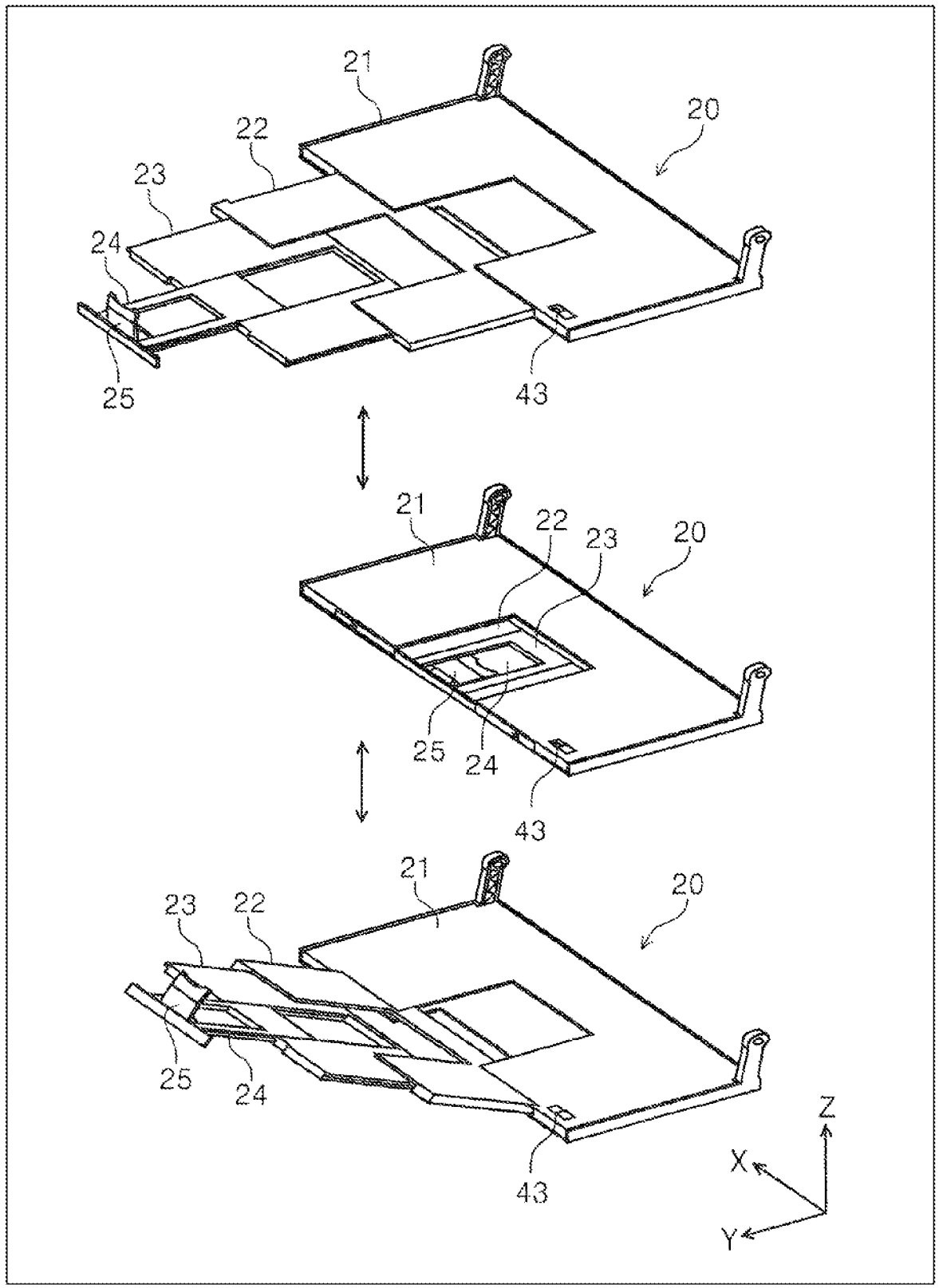
FIG. 14 is a diagram for explaining a modification of the second embodiment.

As illustrated in FIG. 14, a lock pin 43 can be used as a locking portion that locks the discharge tray 20 in one or both of the first posture and the second posture.

The lock pin 43 can be provided on the first tray 21 as an example. The second tray 22 is provided with a pin hole (not illustrated) into which the lock pin 43 can be inserted and removed. As illustrated in the lower diagram of FIG. 14, the pin hole is disposed at a position where the lock pin 43 can be inserted when the angle of the second tray 22 with respect to the first tray 21 is set to the second angle α2. Therefore, when the lock pin 43 is inserted into the pin hole, the discharge tray 20 is locked in the second posture.

In FIG. 14, the lock pin 43 is configured to be inserted into and removed from the pin hole of the second tray 22 by, for example, manually moving the lock pin 43 in the X-axis direction.

As illustrated in the upper diagram of FIG. 14, when the discharge tray 20 takes the first posture, or as illustrated in the middle diagram of FIG. 14, when the second tray 22, the third tray 23, and the fourth tray 24 are slid and stored with respect to the first tray 21, the lock pin 43 is moved in the −X direction, which is the direction away from the second tray 22.

When the discharge tray 20 is in the second posture, the lock pin 43 can be moved in the +X direction and inserted into a pin hole (not illustrated) provided in the second tray 22 to maintain the second posture of the discharge tray 20.

Third Embodiment

Hereinafter, yet another example of the discharge tray 20 will be described with reference to FIGS. 15 and 16.

Figure 15:
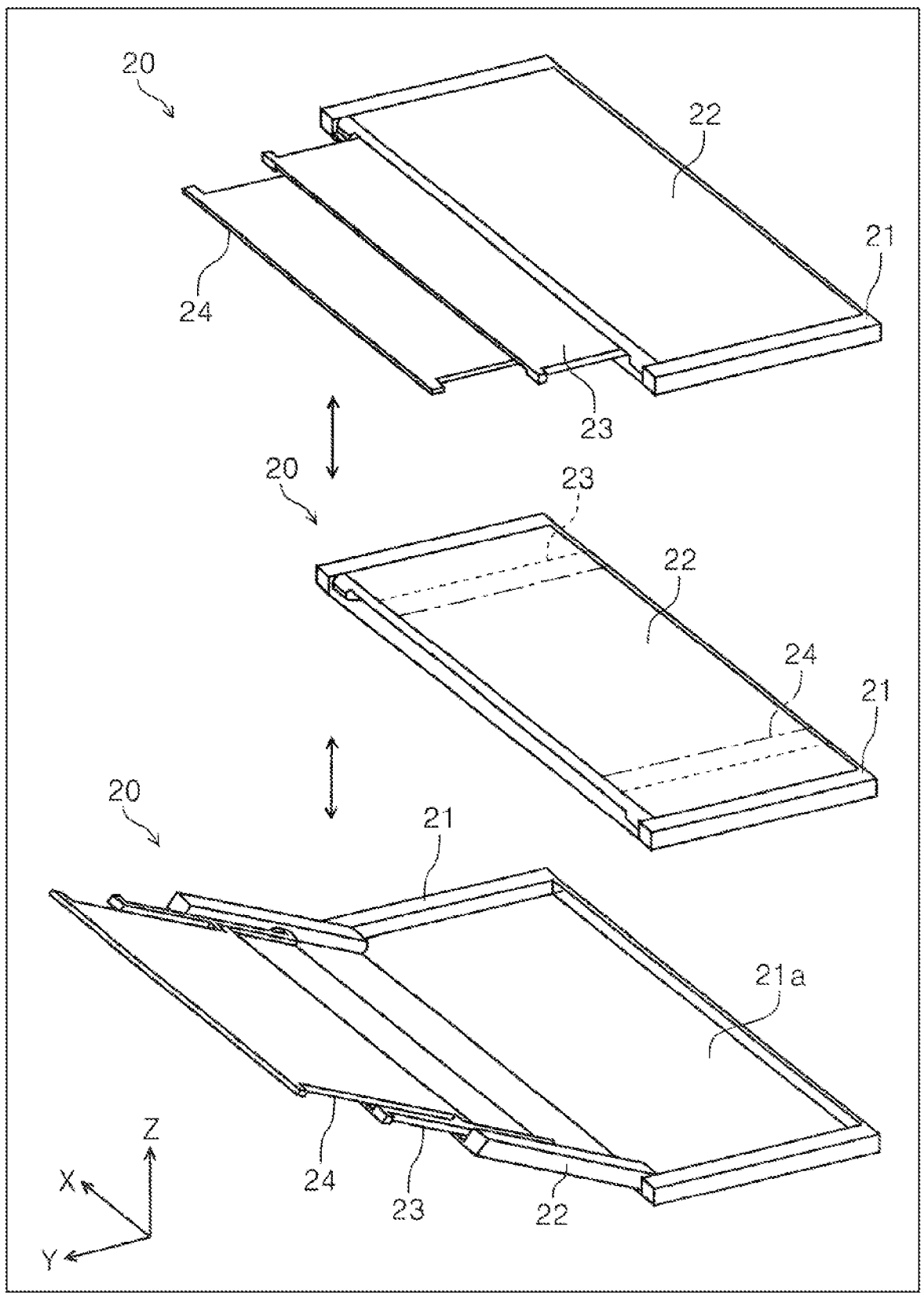
FIG. 15 is a diagram illustrating a third embodiment.
Figure 16:
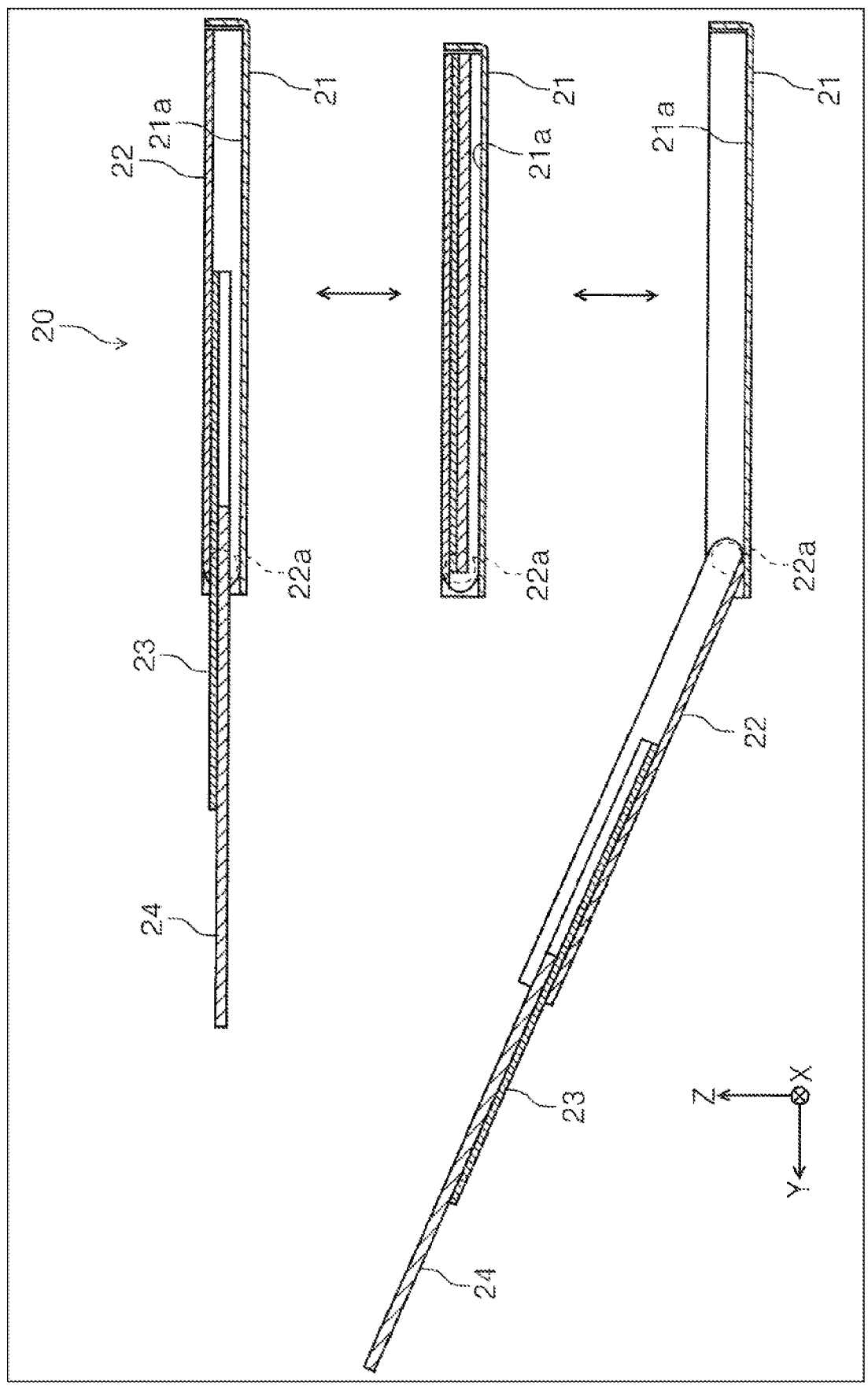
FIG. 16 is a diagram illustrating the third embodiment.

As illustrated in the upper view of FIG. 15 and the upper view of FIG. 16, the discharge tray 20 of the third embodiment is configured such that, when the discharge tray 20 of the third embodiment is in the first posture, the second tray 22 slides with respect to the first tray 21, and when the discharge tray 20 is set to the second posture as illustrated in the lower diagram of FIG. 15 and the lower diagram of FIG. 16, the second tray 22 pivots with respect to the first tray 21.

As illustrated in each drawing of FIG. 16, the second tray 22 is attached to the first tray 21 via a pivot shaft 22a. The first tray 21 includes a storage portion 21a formed as a recessed portion as illustrated in the lower diagram of FIG. 15, and is configured to store the second tray 22 therein as illustrated in the middle diagram of FIG. 15.

As illustrated in the upper diagram of FIG. 15 and the upper diagram of FIG. 16, the discharge tray 20 of the third embodiment, with the second tray 22 stored in the storage portion 21a of the first tray 21, can be set in the first posture by pulling out the third tray 23 and the fourth tray 24 in the +Y direction, and as illustrated in the lower diagram of FIG. 15 and the lower diagram of FIG. 16, can be set to the second posture by pivoting the second tray 22 with respect to the first tray 21 about the pivot shaft 22a.

The third tray 23 and the fourth tray 24 can be pulled out to the free end side of the second tray 22, which has been pivoted.

Fourth Embodiment

Still yet another example of the discharge tray 20 will be described with reference to FIG. 17.

Figure 17:
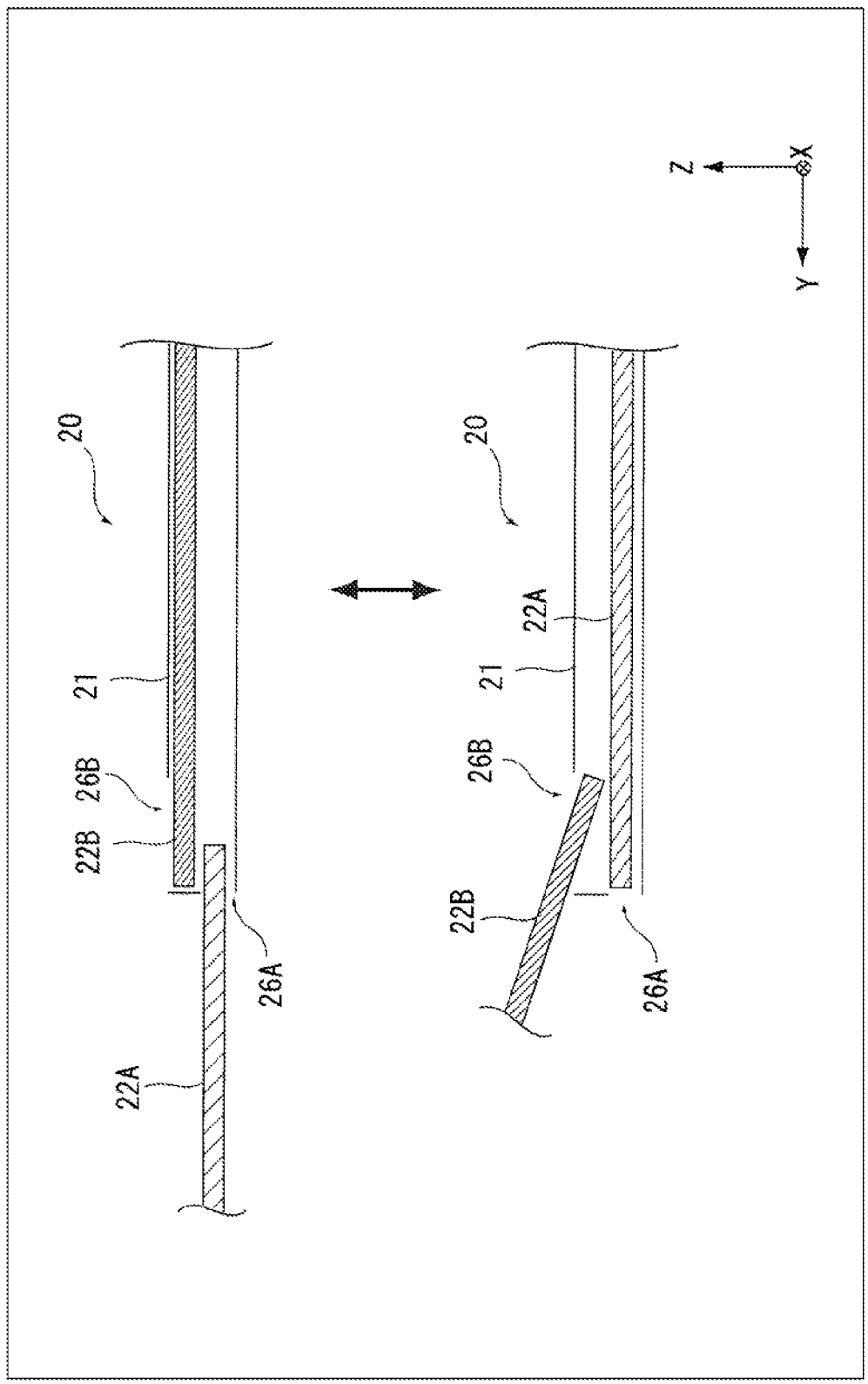
FIG. 17 is a diagram illustrating a fourth embodiment.

As illustrated in FIG. 17, the discharge tray 20 of the fourth embodiment includes a second tray 22A and a second tray 22B. The second tray 22A and the second tray 22B are stored in the first tray 21 in a state where they lay flat.

The first tray 21 includes an outlet 26A through which the second tray 22A can advance on the side surface in the +Y direction, and an outlet 26B through which the second tray 22B can advance.

The second tray 22A can be advanced substantially horizontally with respect to the first tray 21, as illustrated in the upper diagram of FIG. 17. As illustrated in the lower diagram of FIG. 17, the second tray 22B can be advanced in an inclined posture that rises downstream (+Y direction) in the medium discharge direction.

With the above configuration, by moving the second tray 22A forward, the discharge tray 20 can be set to the first posture illustrated in the upper diagram of FIG. 17, and by moving the second tray 22B forward, the discharge tray 20 can be set to the second posture illustrated in the lower diagram of FIG. 17.

In addition, it goes without saying that the present disclosure is not limited to the above embodiment, and various modifications are possible within the scope of the disclosure described in the claims, and they are also included in the scope of the present disclosure.

What is claimed is:

1. An image reading apparatus comprising:
  a casing;
  a reader that reads an image of a medium;
  a discharge roller that discharges the medium whose image has been read by the reader from the casing;
  a feed tray on which the medium before being read by the reader is placed, the feed tray being provided as to be pivotable with respect to a pivot shaft provided in the casing;
  a discharge tray including a first tray configured to receive a front end of the medium discharged by the discharger and allow placement of the medium therein, and a second tray that is located downstream of the first tray in a medium discharge direction and configured to allow placement of the medium therein; and
  an operation panel that is provided on the casing and displays content related to apparatus operation including a reading setting content,
  wherein the discharge tray is configured to switch between a deployed state that allows placement of the medium therein and a stored state in which a portion of the casing is covered by the first tray or both the first tray and the second tray,
  wherein the discharge tray is configured to switch between a first posture in which the first tray and the second tray form a first angle in a side view in the medium discharge direction, and a second posture in which the first tray and the second tray form a second angle smaller than the first angle, without changing the posture of the first tray with respect to the discharger,
  wherein the second tray is configured to be stored in the first tray in the stored state,
  wherein the first angle is set so that a medium receiving surface of the first tray and a medium receiving surface of the second tray are substantially flush with each other, and the first tray is substantially flush with the casing, and
  wherein the discharge tray in the stored state is not overlapped by the feed tray in the stored state at a casing surface provided at the operational panel.

2. The image reading apparatus according to claim 1, wherein
  the second tray includes a sliding shaft that is configured to slide with respect to the first tray in a medium discharge direction and in an opposite direction,
  the first tray includes a guide rail that guides the sliding shaft, and
  the guide rail has, for positioning the sliding shaft, a first position where an angle of the second tray with respect to the first tray becomes a first angle and a second position where the angle becomes a second angle.

3. The image reading apparatus according to claim 2, wherein the guide rail includes a recess that holds the sliding shaft in one or both of the first position and the second position.

4. The image reading apparatus according to claim 1, wherein
  the discharge tray is configured to switch between the first posture and the second posture by pivoting of the second tray with respect to the first tray, and the discharge tray is provided with a locking portion that locks the discharge tray in one or both of the first posture and the second posture.

5. The image reading apparatus according to claim 1, wherein the second tray is provided with a third tray that is configured to be deployed and stored with respect to the second tray.

6. The image reading apparatus according to claim 5, wherein the third tray is provided with a fourth tray that is configured to be deployed and stored with respect to the third tray.

7. The image reading apparatus according to claim 1, wherein
the second tray includes a first sliding shaft and a second sliding shaft that are configured to slide with respect to the first tray in a medium discharge direction and in an opposite direction,
the first tray includes a guide rail that guides the first sliding shaft and the second sliding shaft, and
the guide rail has, for positioning the first sliding shaft, a first position where an angle of the second tray with respect to the first tray becomes a first angle and a second position where the angle becomes a second angle.

8. The medium image reading according to claim 1, wherein
the second tray includes a sliding shaft that is configured to slide with respect to the first tray in a medium discharge direction and in an opposite direction,
the first tray includes a guide rail that guides the sliding shaft,
the guide rail has, for positioning the sliding shaft, a first position where an angle of the second tray with respect to the first tray becomes a first angle and a second position where the angle becomes a second angle, and
the discharge tray is provided with a first stopper and a second stopper that hold the sliding shaft when the discharge tray is in the first posture and the second posture.

9. The medium discharging apparatus according to claim 1, wherein
the second tray includes a sliding shaft that is configured to slide with respect to the first tray in a medium discharge direction and in an opposite direction,
the first tray includes a guide rail that guides the sliding shaft and a locking portion that locks the discharge tray in one or both of the first posture and the second posture, the locking portion being provided on a surface of the first tray on which the medium is placed.

10. The image reading apparatus according to claim 1, wherein the operation panel includes a touch panel.

11. The image reading apparatus according to claim 1, further comprising:
a support member that supports rotatably the casing, wherein the casing is configured to change a support posture with respect to the support member.

12. The image reading apparatus according to claim 11, further comprising:
a discharging port that is provided on the front surface side of the casing, the medium being discharged from the discharge port by the discharge roller, the discharging port being configured to change to a downward posture.

* * * * *